US012231434B1

(12) United States Patent
Zhang et al.

(10) Patent No.: US 12,231,434 B1
(45) Date of Patent: Feb. 18, 2025

(54) CLOUD DATA ATTACK SURFACE TRACKING USING GRAPH-BASED EXCESSIVE PRIVILEGE DETECTION

(71) Applicant: Normalyze, Inc., Los Altos, CA (US)

(72) Inventors: Yang Zhang, Fremont, CA (US); Ajay Agrawal, Bangalore (IN); Ravishankar Ganesh Ithal, Los Altos, CA (US)

(73) Assignee: Normalyze, Inc., Los Altos, CA (US)

( * ) Notice: Subject to any disclaimer, the term of this patent is extended or adjusted under 35 U.S.C. 154(b) by 0 days.

(21) Appl. No.: 18/785,419

(22) Filed: Jul. 26, 2024

(51) Int. Cl.
*H04L 9/40* (2022.01)

(52) U.S. Cl.
CPC .......... *H04L 63/104* (2013.01); *H04L 63/105* (2013.01); *H04L 63/108* (2013.01); *H04L 63/1416* (2013.01); *H04L 63/1425* (2013.01)

(58) Field of Classification Search
None
See application file for complete search history.

(56) References Cited

U.S. PATENT DOCUMENTS

| | | | | |
|---|---|---|---|---|
| 10,601,876 | B1 * | 3/2020 | Levy | H04L 67/10 |
| 10,728,034 | B2 * | 7/2020 | Sandoval | G06F 9/44521 |
| 11,895,121 | B1 * | 2/2024 | Karim | H04L 63/20 |
| 2014/0055804 | A1 * | 2/2014 | Eguchi | G06F 3/1238 |
| | | | | 358/1.14 |
| 2017/0295197 | A1 * | 10/2017 | Parimi | H04L 63/10 |
| 2019/0087489 | A1 * | 3/2019 | Culhane | G06F 16/316 |
| 2020/0336503 | A1 * | 10/2020 | Xu | G06F 40/284 |
| 2021/0112086 | A1 * | 4/2021 | Chandana | H04L 63/1425 |
| 2022/0263835 | A1 * | 8/2022 | Pieczul | H04L 63/104 |

\* cited by examiner

*Primary Examiner* — Kaveh Abrishamkar
(74) *Attorney, Agent, or Firm* — Flagship Patents; Sikander M. Khan; Christopher Volkmann

(57) ABSTRACT

A computer-implemented method includes detecting occurrence of an event in a cloud environment, obtaining an indication of an identity associated with the event, obtaining an indication of a usage time stamp representing usage time of a privilege in association with the identity for the event, and classifying the privilege into a classification group selected from a plurality of predefined classification groups. Each respective classification group groups a respective set of privileges defined in the cloud environment. The method includes obtaining a grant time stamp representing a grant time of at least one privilege, in the respective set of privileges in the classification group, to the identity and, based on the usage time stamp and the grant time stamp, generating an excessive privilege determination that indicates the classification group includes at least one excessive privilege. The method includes performing a computing action based on the excessive privilege determination.

18 Claims, 19 Drawing Sheets

CLOUD DATA ATTACK SURFACE TRACKING USING GRAPH-BASED EXCESSIVE PRIVILEGE DETECTION

CROSS-REFERENCE TO RELATED APPLICATION

The present application claims the benefit of Indian application No. 202311050872, filed Jul. 28, 2023, the contents of which is hereby incorporated by reference in its entirety.

FIELD OF THE TECHNOLOGY DISCLOSED

The technology disclosed generally relates to computing environments, such as cloud environments, that utilize privileges for access control to resources. More specifically, but not by limitation, the present disclosure relates to improved systems and methods of cloud security posture management (CSPM), cloud infrastructure entitlement management (CIEM), cloud-native application protection platform (CNAPP), cloud-native configuration management database (CMDB), and/or data security posture management (DSPM).

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

There are many types of computing environments that provide data storage and/or computing resources for organizations or other end users. Cloud computing, for example, provides on-demand availability of computer resources, such as data storage and compute resources, often without direct active management by users. Thus, a cloud environment can provide computation, software, data access, and storage services that do not require end-user knowledge of the physical location or configuration of the system that delivers the services. In various examples, remote servers can deliver the services over a wide area network, such as the Internet, using appropriate protocols, and those services can be accessed through a web browser or any other computing component.

Examples of cloud storage services include Amazon Web Services™ (AWS), Google Cloud Platform™ (GCP), and Microsoft Azure™, to name a few. Such cloud storage services provide on-demand network access to a shared pool of configurable resources. These resources can include networks, servers, storage, applications, services, etc. The end-users of such cloud services often include organizations that have a need to store sensitive and/or confidential data, such as personal information, financial information, medical information. Such information can be accessed by any of a number of users through permissions and access control data assigned or otherwise defined through administrator accounts.

The discussion above is merely provided for general background information and is not intended to be used as an aid in determining the scope of the claimed subject matter.

SUMMARY

The technology disclosed relates to cloud, or other computing environments, that utilize privileges for access control to resources. In described examples, the disclosed technology relates to a system and method that detects occurrence of an event in a cloud environment, obtains an indication of an identity associated with the event, obtains an indication of a usage time stamp representing usage time of a privilege in association with the identity for the event in the cloud environment, and classifies the privilege into a classification group selected from a plurality of predefined classification groups. Each respective classification group, of the plurality of predefined classification groups, groups a respective set of privileges defined in the cloud environment. A grant time stamp is obtained representing a grant time of at least one privilege, in the respective set of privileges in the classification group, to the identity and, based on the usage time stamp and the grant time stamp, an excessive privilege determination is generated that indicates the classification group includes at least one excessive privilege. A computing action is performed based on the excessive privilege determination.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIGS. 8-1 and 8-2 (collectively referred to as FIG. 8) provide a flow diagram illustrating one example of infrastructure analysis and query execution.

FIGS. 13-1 and 13-2 (collectively referred to as FIG. 13) provide a flow diagram illustrating an example operation of scanning event logs to identify privilege usage within a cloud service.

DETAILED DESCRIPTION

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

As noted above, cloud computing environments are used by organizations or other end-users to store a wide variety of different types of information in many contexts and for many uses. This data can often include sensitive and/or confidential information, and can be the target for malicious activity such as acts of fraud, privacy breaches, data theft, etc. These risks can arise from individuals that are both inside the organization as well as outside the organization.

Cloud environments often include security infrastructure that utilize privileges assigned to users, resources, or other entities to enforce access control, data loss prevention, or other processes to secure data from potential vulnerabilities. However, the existence of an excess privilege can increase the attack surface of a cloud infrastructure. For example, if a cloud account is breached, and that cloud account includes excess privileges, then a surreptitious user is able to infiltrate a greater extent into the cloud account.

The present technology relates to the identification of excessive privileges which can be utilized to perform remedial action, which can include remove of the excessive privileges to improve the overall security posture of the cloud infrastructure.

Figure 1:
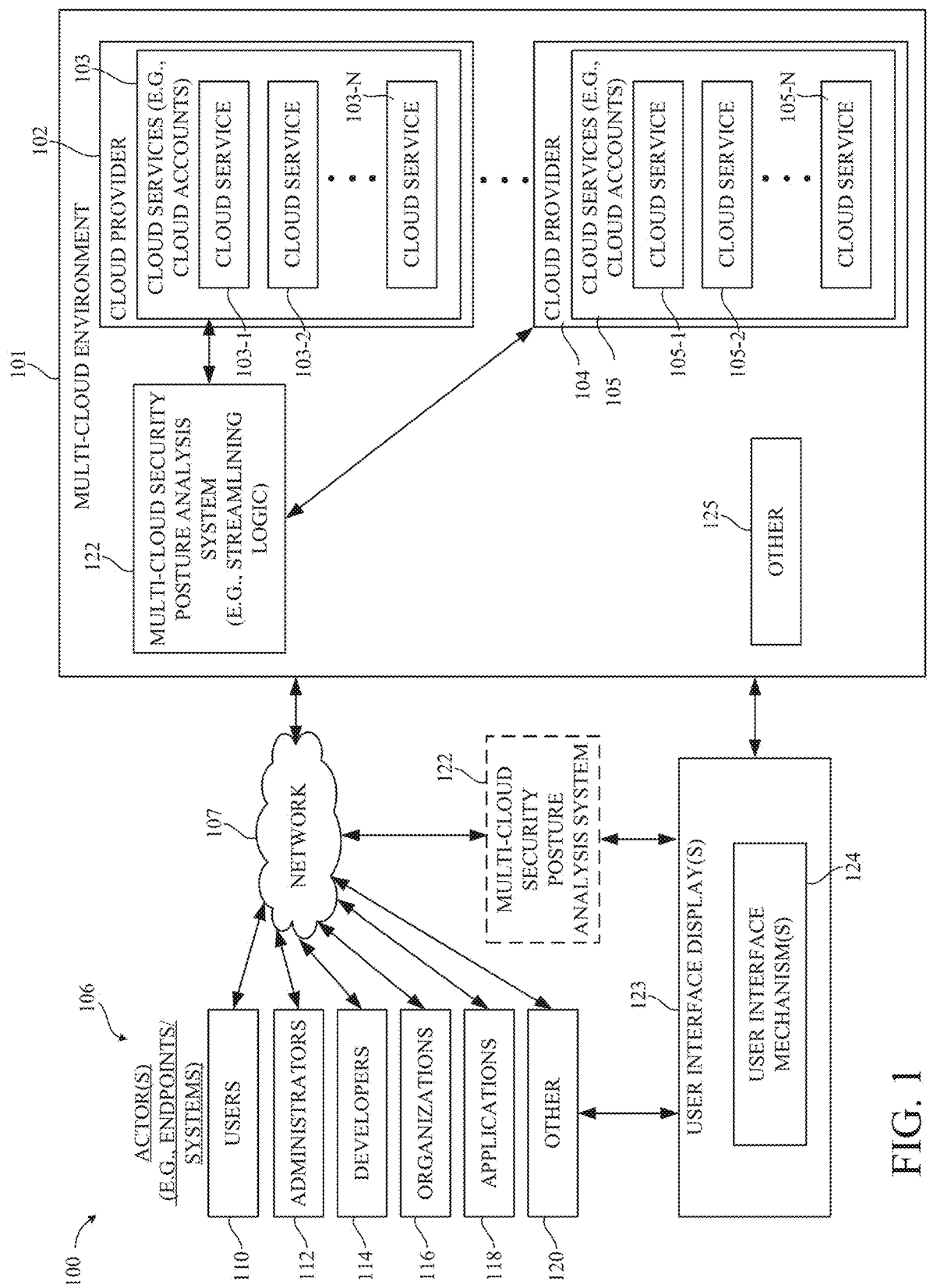
FIG. 1 is a block diagram illustrating one example of a cloud architecture.

FIG. 1 is a block diagram illustrating one example of a cloud architecture 100 in which a cloud environment 101 is accessed by one or more actors 106 through a network 107, such as the Internet or other wide area network. Cloud environment 101 is illustratively a multi-cloud environment (also referred to herein as multi-cloud environment 101) in which multiple different cloud providers (e.g., cloud service providers (CSPs) provide cloud services. As shown, a first cloud provider 102 includes one or more cloud services 103-1, 103-2, 103-N, collectively referred to as cloud services 103. As noted above, cloud provider 102 can include a cloud provider such as, but not limited to, AWS, GCP, Microsoft Azure, to name a few.

Cloud services 103-1, 103-2, 103-N can include the same type of cloud service, or can be different types of cloud services, and can be accessed by any of a number of different actors 106. For example, as illustrated in FIG. 1, actors 106 include users 110, administrators 112, developers 114, organizations 116, and/or applications 118. Of course, other actors 120 can access cloud environment 101 as well.

A second cloud provider 104 includes one or more cloud services 105-1, 105-2, 105-N, collectively referred to as cloud services 105. In a multi-cloud environment, cloud provider 104 can be different than cloud provider 102 (e.g., AWS and GCP etc.).

Architecture 100 includes a cloud security posture analysis system 122 configured to access cloud services to identify and analyze cloud infrastructure and data security posture within cloud environment. Cloud security posture analysis system 122 is considered a multi-cloud security posture analysis system (also referred to herein as multi-cloud security posture analysis system 122) is configured to analyze cloud services across multiple different cloud service providers. In this way, system 122 is service provider agnostic, and is configured to interact with the different cloud provider specific interfaces and policies.

Examples of system 122 are discussed in further detail below. Briefly, however, system 122 is configured to access cloud services 103 and identify cloud infrastructure assets, such as by identifying connected resources, entities, actors, etc. within those cloud services, and to identify risks and violations against access to sensitive information. As shown in FIG. 1, system 122 can reside within cloud environment 101 or outside cloud environment 101, as represented by the dashed box in FIG. 1. Of course, system 122 can be distributed across multiple items inside and/or outside cloud environment 101.

Users 110, administrators 112, developers 114, or any other actors 106, can interact with cloud environment 101 through user interface displays 123 having user interface mechanisms 124. For example, a user can interact with user interface displays 123 provided on a user device (such as a mobile device, a laptop computer, a desktop computer, etc.) either directly or over network 107. Cloud environment 101 can include other items 125 as well.

Figure 2:
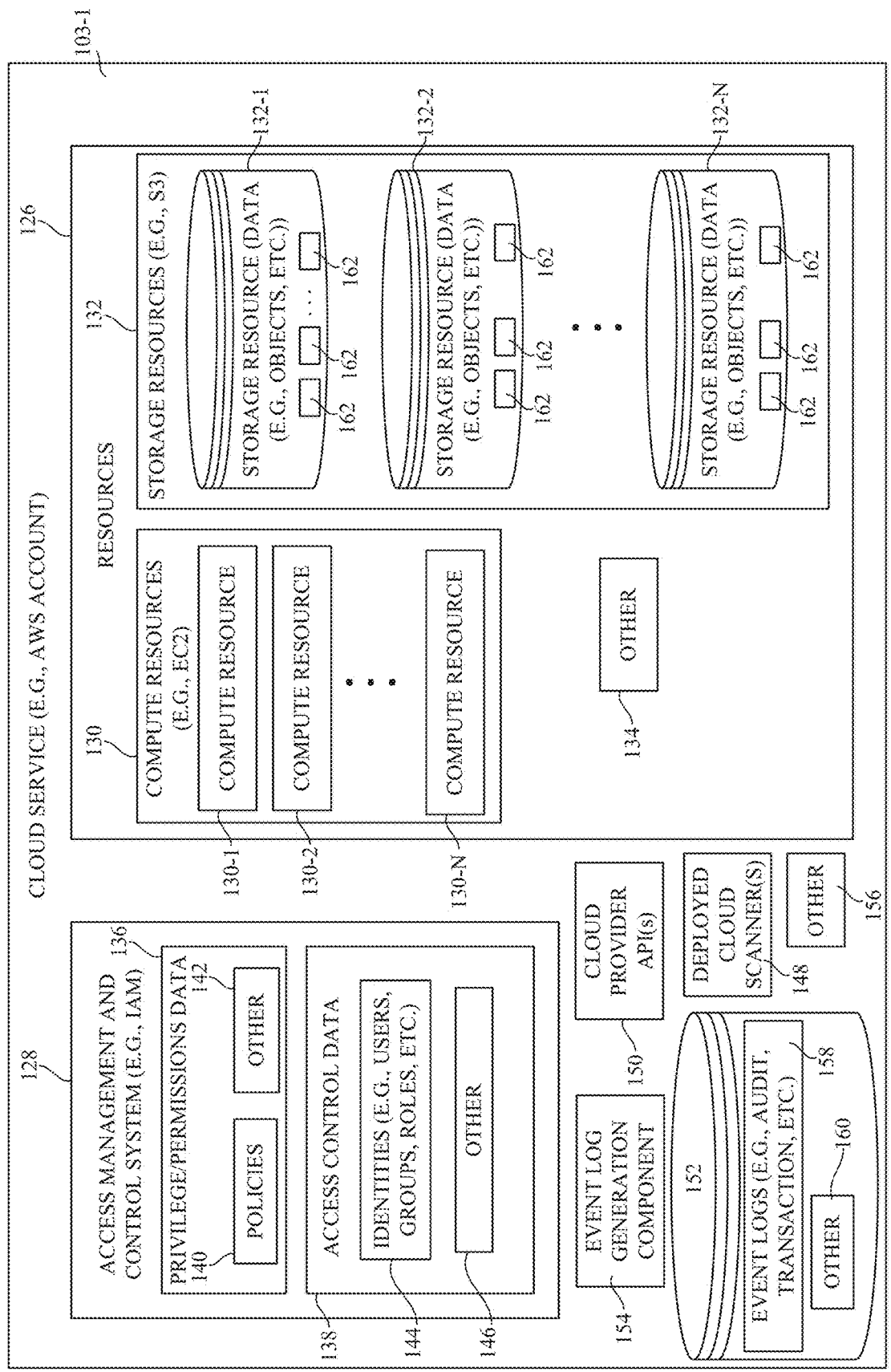
FIG. 2 is a block diagram illustrating one example of a cloud service.

FIG. 2 is a block diagram illustrating one example of cloud service 103-1. For the sake of the present discussion, but not by limitation, cloud service 103-1 will be discussed in the context of an account within AWS. Of course, other types of cloud services and providers are within the scope of the present disclosure.

Cloud service 103-1 includes a plurality of resources 126 and an access management and control system 128 configured to manage and control access to resources 126 by actors 106. Resources 126 include compute resources 130, storage resources 132, and can include other resources 134. Compute resources 130 include a plurality of individual compute resources 130-1, 130-2, 130-N, which can be the same and/or different types of compute resources. In the present example, compute resources 130 can include elastic compute resources, such as elastic compute cloud (AWS EC2) resources, AWS Lambda, etc.

An elastic compute cloud (EC2) is a cloud computing service designed to provide virtual machines called instances, where users can select an instance with a desired amount of computing resources, such as the number and type of CPUs, memory and local storage. An EC2 resource allows users to create and run compute instances on AWS, and can use familiar operating systems like Linux, Windows, etc. Users can select an instance type based on the memory and computing requirements needed for the application or software to be run on the instance.

AWS Lambda is an event-based service that delivers short-term compute capabilities and is designed to run code without the need to deploy, use or manage virtual machine instances. An example implementation is used by an organization to address specific triggers or events, such as database updates, storage changes or custom events generated from other applications. Such a compute resource can include a server-less, event-driven compute service that allows a user to run code for many different types of applications or backend services without provisioning or managing servers.

Storage resources 132 are accessible through compute resources 130, and can include a plurality of storage resources 132-1, 132-2, 132-N, which can be the same and/or different types of storage resources. A storage resource 132 can be defined based on object storage. For example, AWS Simple Storage Service (S3) provides highly-scalable cloud object storage with a simple web service interface. An S3 object can contain both data and metadata, and objects can reside in containers called buckets. Each bucket can be identified by a unique user-specified key or file name. A bucket can be a simple flat folder without a file system hierarchy. A bucket can be viewed as a container (e.g., folder) for objects (e.g., files) stored in the S3 storage resource.

Compute resources 130 can access or otherwise interact with storage resources 132 through network communication paths based on privileges/permissions data 136 and/or access control data 138. System 128 illustratively includes identity and access management (IAM) functionality that controls access to cloud service 103-1 using entities (e.g., IAM entities) provided by the cloud computing platform.

Privileges/permissions data 136 includes policies 140 and can include other data 142 defining permissions and/or privileges. For purposes of some examples discussed herein, the terms "privileges" and "permissions" is used interchangeably. An example privilege includes a property of an agent, such as a user or resource, that allows the agent to perform an action not ordinarily allowed. Another example includes a property of an object, such as a file, and defines which agents are permitted to use the object, and what the agent is permitted to do (read, write, modify, etc.).

Access control data 138 includes identities 144 and can include other access control data 146 as well. Examples of identities 144 include, but are not limited to, users, groups, roles, etc. In AWS, for example, an IAM user is an entity that is created in the AWS service and represents a person or service who uses the IAM user to interact with the cloud service. An IAM user provides the ability to sign into the AWS management console for interactive tasks and to make programmatic requests to AWS services using the API, and includes a name, password, and access keys to be used with the API. Permissions can be granted to the IAM user to make the IAM user a member of a user group with attached permission policies. An IAM user group is a collection of IAM users with specified permissions. Use of IAM groups can make management of permissions easier for those users. An IAM role in AWS is an IAM identity that has specific permissions, and has some similarities to an IAM user in that the IAM role is an AWS identity with permission policies that determine what the identity can and cannot do in AWS. However, instead of being uniquely associated with one person, a role is intended to be assumable by anyone who needs it. Roles can be used to delegate access to users, applications, and/or services that don't normally have access to the AWS resources. Roles can be used by IAM users in a same AWS account and/or in different AWS accounts than the role. Also, roles can be used by compute resources 130, such as EC2 resources. A service role is a role assumed by a service to perform actions in an account on behalf of a user. Service roles include permissions required for the service to access the resources needed by the service. Service roles can vary from service to service. A service role for an EC2 instance, for example, is a special type of service role that an application running on an EC2 instance can assume to perform actions.

Policies 140 can include identity-based policies that are attached to IAM identities can grant permissions to the identity. Policies 140 can also include resource-based policies that are attached to resources 126. Examples include S3 bucket policies and IAM role trust policies. An example trust policy includes a JSON policy document that defines the principles that are trusted to assume a role. In AWS, a policy is an object that, when associated with an identity or resource, defines permissions of the identity or resource. AWS evaluates these policies when an IAM principal user or a role) makes a request. Permissions in the policy determine whether the request is allowed or denied. Policies are often stored as JSON documents that are attached to the IAM identities (user, groups of users, role).

A permissions boundary is a managed policy for an IAM identity that defines the maximum permissions that the identity-based policies can grant to an entity, but does not grant the permissions. Further, access control lists (ACLs) control which principles in other accounts can access the resource to which the ACL is attached. ACLs can be similar to resource-based policies. In some implementations of the technology disclosed, the terms "roles" and "policies" are used interchangeably.

Cloud service 103-1 includes one or more deployed cloud scanners 148, cloud provider application programming interface(s) (APIs) 150, a data store 152, an event log generation component 154, and can include other items 156 as well. Cloud scanner 148 run locally on the cloud-based services and the server systems, and can utilize elastic compute resources, such as, but not limited to, AWS Lambda resources. Cloud scanner 148 is configured to access and scan the cloud service 103-1 on which the scanner is deployed. Examples are discussed in further detail below. Briefly, however, a scanner accesses the data stored in storage resources 132, privileges/permissions data 136, and access control data 138 to identify particular data patterns (such as, but not limited to, sensitive string patterns) and traverse or trace network communication paths between pairs of compute resources 130 and storage resources 132. The results of the scanner can be utilized to identify subject vulnerabilities, such as resources vulnerable to a breach attack, and to construct a cloud attack surface graph or other data structure that depicts propagation of a breach attack along the network communication paths.

Given a graph of connected resources, such as compute resources 130, storage resources 132, etc., entities (e.g., accounts, roles, policies, etc.), and actors (e.g., users, administrators, etc.), risks and violations against access to sensitive information is identified. A directional graph can be built to capture nodes that represent the resources and labels that are assigned for search and retrieval purposes. For example, a label can mark the node as a database or S3 resource, actors as users, administrators, developers, etc. Relationships between the nodes are created using information available from the cloud infrastructure configuration. For example, using the configuration information, system 122 can determine that a resource belongs to a given account and create a relationship between the policy attached to a resource and/or identify the roles that can be taken up by a user.

Event log generation component 154 is configured to generate event logs 158 (also referred to as activity logs), which record actions taken by a user, a role, or a cloud service as events. Component 154, in one example, is configured to deploy a database log generator on each of a plurality of databases 162 on storage resources 132. Databases 162 can store information in any of a plurality of different types of structures. For example, some or all databases 162 can comprise structured query language (SQL) databases that store and organize data in tables with related information. Each table consists of rows and columns, with each row representing a record and each column representing a specific data field. SQL databases allow users to manipulate data through SQL commands. Some examples of SQL databases include MySQL and PostgreSQL, to name a few. Alternatively, or in addition, some or all databases 162 can include non-SQL databases.

The respective event log generator, for each respective database 162, generates a respective database log in event logs 158. An example log includes log entries that record the database activities, events, etc. Example logs include, but not limited to, audit logs, transaction logs, etc.

As noted above, in some examples, resources 126 can include AWS EC2 and/or Lambda resources. Also, resources 126 can include AWS Instance Stores and/or AWS Elastic Block Store (EBS) volumes. An EBS volume is a durable, block-level storage device that can attach to a compute instance and used as a physical hard drive.

Resources 126 can also include an Azure blob identified by a resource URL syntax that assigns each resource a corresponding base URL.

A cloud storage service or cloud service provider (CSP) can include an organization which hosts services such as networking, software, servers, and/or infrastructure, among others. A CSP can also provide security for the provided services. The services provided by the CSP can relieve a client organization of individual responsibility of setting and managing infrastructure. Examples of CSPs include Amazon Web Services™, Microsoft Azure™, Salesforce™, Google Cloud Platform™, among others.

Cloud provider APIs 150 are configured to receive calls to access various components in cloud service 103. For example, cloud provider APIs 150 can access event logs 158 stored in data store 152. Data store 152 can also store other data items 160 as well.

A CSP generally provides a number of different interfaces to cloud-computing services, such as a service-provider interface to organizational clients for computing services. A CSP, for example, provides interfaces that allow cloud-computing clients to launch virtual machines, application programs, and other computational entities. A CSP can also provide user interface that allow claims to access, through the Internet, the services provided by the CSP. A client of the CSP can deploy web servers to access, modify, and send information.

A cloud account provided by a CSP includes roles that determine user privileges users and what actions can be taken in the cloud account. An identify and access management (IAM) role is managed by the CSP and provides predefined roles that give granular access to specific CSP resources and prevent unwanted access to other CSP resources. For instance, an AWS IAM role includes an AWS identity with a set of permissions policies that each determine what the role can do within an AWS account. An IAM role can be assumed by anyone who needs requires the role.

Figure 3:
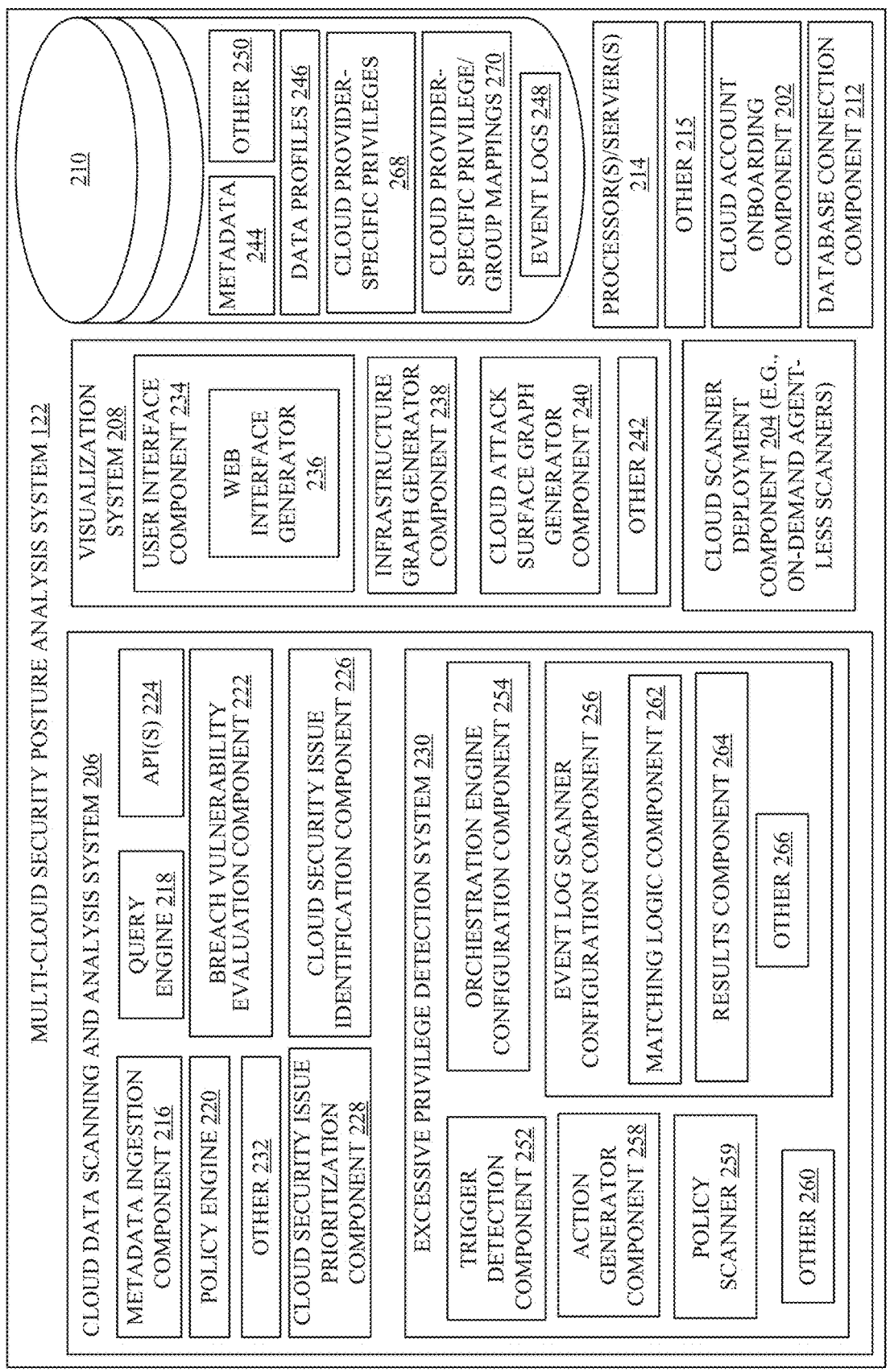
FIG. 3 is a block diagram illustrating one example of a cloud security posture analysis system.

FIG. 3 is a block diagram illustrating one example of cloud security posture analysis system 122. As noted above, system 122 can be deployed in cloud environment 101 and/or access cloud environment 101 through network 107 shown in FIG. 1.

System 122 includes a cloud account onboarding component 202, a cloud scanner deployment component 204, a cloud data scanning and analysis system 206, a visualization system 208, and a data store 210. System 122 can also include a database connection component 212, one or more processors or servers 214, and can include other items 215 as well.

Cloud account onboarding component 202 is configured to onboard cloud services 103 for analysis by system 122. After onboarding, cloud scanner deployment component 204 is configured to deploy a cloud scanner (e.g., deployed cloud scanner(s) 148 shown in FIG. 2) to the cloud service. In one example, the deployed scanners are on-demand agent-less scanners configured to perform agent-less scanning within the cloud service. One example of an agent-less scanner does not require agents to be installed on each specific device or machine. The scanners operate on resources 126 and access management and control system 128 directly within the cloud service, and generate metadata that is returned to system 122. Thus, in one example, the actual cloud service data is not required to leave the cloud service for analysis.

Cloud data scanning and analysis system 206 includes a metadata ingestion component 216 configured to receive the metadata generated by the deployed cloud scanner(s) 148. System 206 also includes a query engine 218, a policy engine 220, a breach vulnerability evaluation component 222, one or more application programming interfaces (APIs) 224, a cloud security issue identification component 226, a cloud security issue prioritization component 228, an excessive privilege detection system 230, and can include other items 232 as well.

Query engine 218 is configured to execute queries against the received metadata and generated cloud security issue data. Policy engine 220 can execute security policies against the cloud data and breach vulnerability evaluation component 222 is configured to evaluate potential breach vulnerabilities in the cloud service. APIs 224 are exposed to users, such as administrators, to interact with system 122 to access the cloud security posture data.

Component 226 is configured to identify cloud security issues and component 228 can prioritize the identified cloud security issues based on any of a number of criteria.

Visualization system 208 is configured to generate visualizations of the cloud security posture from system 206. Illustratively, system 208 includes a user interface component 234 configured to generate a user interface for a user, such as an administrator. In the illustrated example, component 234 includes a web interface generator 236 configured to generate web interfaces that can be displayed in a web browser on a client device.

Visualization system 208 also includes an infrastructure graph generator component 238, a cloud attack surface graph generator component 240, and can include other items 242 as well. Infrastructure graph generator component 238 is configured to generate a graph or other representation of the relationships between resources 126 or other infrastructure assets such as privileges, roles, etc. For example, component 238 can generate a cloud infrastructure graph, such as a map, that graphically depicts pairs of compute resources and storage resources as nodes and network communication paths as edges between the nodes.

Cloud attack surface graph generator component 240 is configured to generate a surface graph or other representation of vulnerabilities of resources to a breach attack. In one example, the representation of vulnerabilities can include a cloud attack surface map that graphically depicts propagation of a breach attack along network communication paths as edges between nodes that represent the corresponding resources.

Data store 210 stores metadata 244 obtained by metadata ingestion component 216, sensitive data profiles 246, detected event logs 248, and can store other items 250 as well. Examples of sensitive data profiles 246 are discussed in further detail below. Briefly, however, sensitive data profiles 246 can identify target data patterns that are to be categorized as sensitive or conforming to a predefined pattern of interest. Sensitive data profiles 246 can be used as training data for data classification. Examples of data classification are discussed in further detail below. For instance, however, pattern matching can be performed based on the target data profiles. Illustratively, pattern matching can be performed to identify instances of data patterns corresponding to social security numbers, credit card numbers, other personal data, medical information, to name a few. In one example, artificial intelligence (AI) is utilized to perform named entity recognition (e.g., natural language processing modules can identify sensitive data, in various languages, representing names, company names, locations, etc.).

Database connection component 212 is configured to connect to, or access, databases in the data stores of the resources being analyzed by system 122. Examples are discussed in further detail below. Briefly, however, database connection component 212 can receive user access credentials, such as a username and password, for each database of a plurality of databases to be accessed in the cloud environment and scanned by the deployed scanners. In another example, database connection component 212 can be configured to connect to representations of the databases that are accessed using a different authentication requirement, than the databases themselves. For example, database connection component 212 can identify and connect to snapshots of the databases through cloud provider APIs 150, discussed above. Database connection component 212 can access event logs 158, for the identified databases, from data store 152.

Excessive privilege detection system 230 is configured to detect excessive privileges that have been granted within a given cloud account (or other cloud service) within multi-cloud environment 101. For sake of illustration, an "excessive privilege" refers to a privilege (such as an access permission to a particular storage resource) that is beyond a target scope defined for a particular entity (e.g., a user, an organization, a resource, etc.) to which the privilege is assigned. For example, the target scope can define a set of privileges required for the particular entity to execute a set of workflows or other actions associated with the particular entity within the cloud environment. Thus, excessive privileges, relative to the particular entity, can include any privilege that is unnecessary (e.g., not required) in course of execution of the set of workflow associated with the particular entity. Alternatively, or in addition, excessive privileges can include privileges that are unused by the particular entity, e.g., within a particular threshold time period.

The existence of an excess privilege can increase the attack surface of a cloud infrastructure. For example, if a cloud account is breached, and that cloud account includes excess privileges, then a surreptitious user is able to infiltrate a greater extent into the cloud account. Removal of excess privileges can improve the overall security posture of the cloud infrastructure.

Excessive privilege detection system 230 includes a trigger detection component 252, an orchestration engine configuration component 254, an event log scanner configuration component 256, an action generator component 258, a policy scanner 259, and can include other items 260 as well.

Operation of system 230 is discussed in further detail below. Briefly, however, trigger detection component 252 is configured to detect a triggering criterion corresponding to initiation of excess privilege detection within multi-cloud environment 101. For example, excess privilege detection can be initiated for one or more cloud accounts in response to detected changes to the infrastructure of the cloud accounts, changes to the privileges in the cloud account, among other triggering criterion.

Orchestration engine configuration component 254 configures an orchestration engine (e.g., a control plane) that is configured to deploy configured event log scanners to the cloud account(s) to scan event logs in those accounts. For example, the orchestration engine can deploy a plurality of microservices to analyze event logs in parallel. Examples of event logs include, but are not limited to, database activity logs.

An example orchestration engine includes a tool or platform that automates and manages the deployment, configuration, coordination, and monitoring of complex applications or services. The orchestration engine can provide a centralized control system that streamlines the management of multiple components and resources, such as containerized applications, across distributed systems. In addition, the orchestration engine can include features such as load balancing, automatic failover, and resource allocation to help ensure that the application is highly available and can scale dynamically to handle changing workloads. In one example, each microservice is configured to perform a specific function that is deployable and scalable independently of other services. The deployed log analyzer microservice(s) return analysis results to the orchestration engine, such as in the form of metadata form the event logs.

Event log scanner configuration component 256 includes a matching logic component 262, a results component 264, and can include other items 266 as well. policy scanner 259 is configured to access and scan policies within a given cloud account to identify privileges that are granted within that cloud account. These privileges can vary based on the particular cloud provider within which the cloud account resides. Cloud provider-specific privileges 268, identified from the policies, can be stored in data store 210. As also discussed in further detail below, the privileges 268 can be semantically grouped into categories (also referred to as semantic groups or classification groups), the represent similar types of operations. These mappings can be stored in data store 210, as represented at block 270.

An event log scanner configured by component 256 is configured to detect, in an event log, instances of privilege usage. Detected instances of privilege usage can be correlated to the classification groups, to identify which of the groups contain excessive privileges.

Action generator component 258 identifies one or more actions to take based on the excessive privileges. For example, a remedial action can be initiated that revokes the excessive privileges, such as by modifying the policy data. Alternatively, or in addition, a user interface display can be generated that renders an indication of the excessive privileges to a user, such as an administrator, for manual action on the excessive privileges (such as to confirm removal of the excessive privileges).

Figure 4:
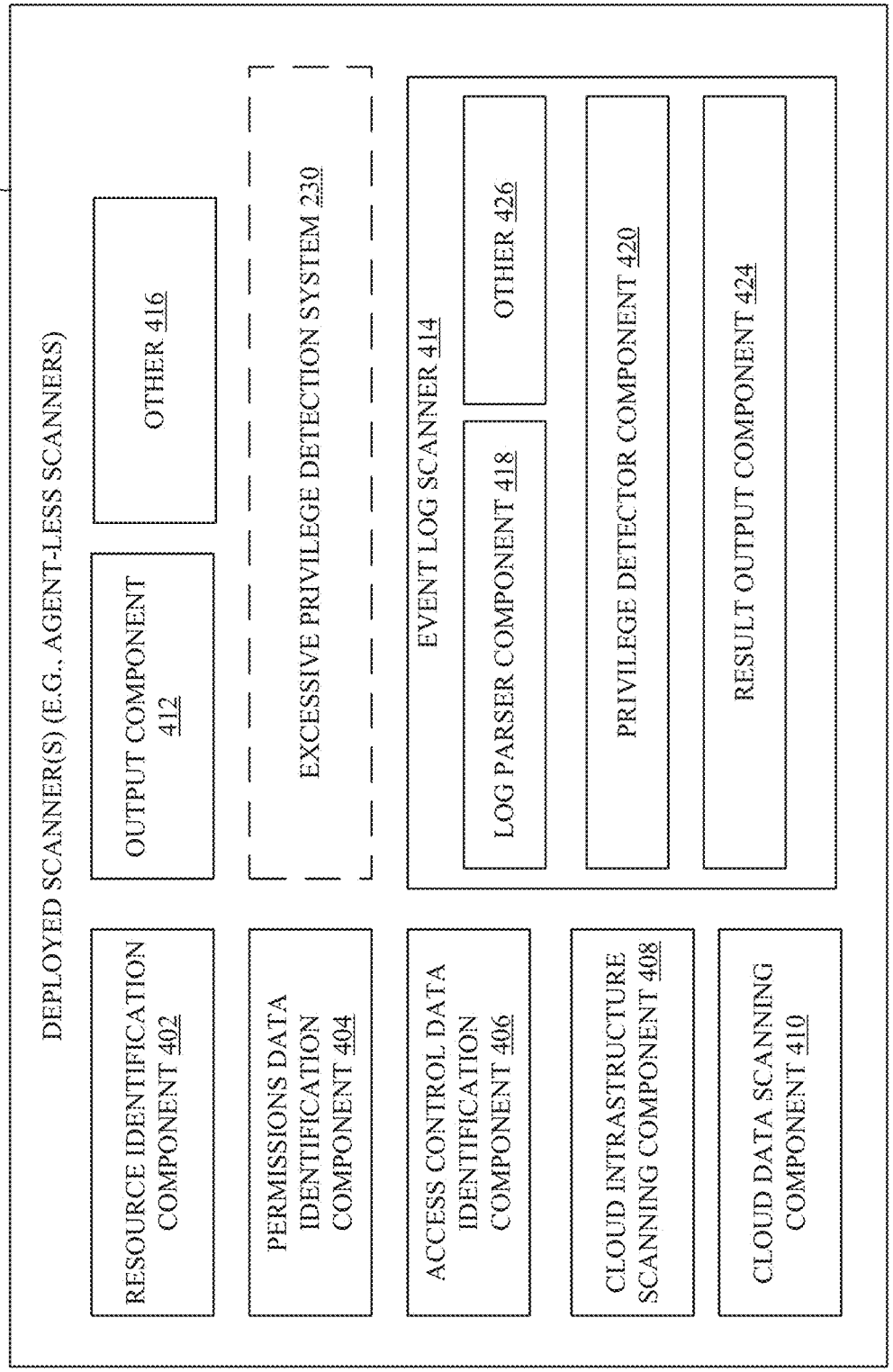
FIG. 4 is a block diagram illustrating one example of a deployed scanner.

FIG. 4 is a block diagram illustrating one example of a deployed scanner 148. Scanner 148 includes a resource identification component 402, a permissions data identification component 404, an access control data identification component 406, a cloud infrastructure scanning component 408, a cloud data scanning component 410, an output component 412, an event log scanner component 414, and can include other items 416 as well. FIG. 4 also illustrates that some or all components of and/or functionality performed by system 230 can be on or otherwise associated with deployed scanner 148.

Resource identification component 402 is configured to identify the resources 126 within cloud service 103-1 (and/or other cloud services 103) and to generate corresponding metadata that identifies these resources. Permissions data identification component 404 identifies the permissions data 136 and access control data identification component 406 identifies access control data 138. Cloud infrastructure scanning component 408 scans the infrastructure of cloud service 103 to identify the relationships between resources 130 and 132 and cloud data scanning component 410 scans the actual data stored in storage resources 132. Output component 412 is configured to output the generated metadata and content-based classification results to cloud security posture analysis system 122.

The metadata generated by scanner 148 can indicate a structure of schema objects in a data store. For example, where the schema objects comprise columns in a data store having a tabular format, the returned metadata can include column names from those columns. A content-based data item classifier is configured to classify data items within the schema objects, based on content of those data items. Examples are discussed in further detail below.

Event log scanner component 414 is configured to analyze event log(s) to identify events that utilized privileges, and to obtain contextual information concerning the privilege usage such as, but not limited to, a timestamp of when the privilege was utilized, the identity (user, role, etc.) that used the privilege, and an asset that was the target of the event, such as a particular resource.

Component 414 includes a log parser component 418, a privilege detector 420, a result output component 424, and can include other items 426 as well.

Briefly, the parsing can be done in any of a number of ways. In one example, log parser component 418 accesses each of a number of entries in the event log, where each entry identifies a particular event that occurred within the cloud environment. Component 418 can identify constituent data fields that identify various characteristics or parameters from a respective event or activity in the cloud environment. For example, the parsing can include an identification of which identity was involved (a resource, a user, etc.), the time at which the event occurred, what geographic region the event occurred in, the service or other asset that was involved in the event, as well as other attributes. These attributes can be returned as metadata by result output component 424.

Figure 5:
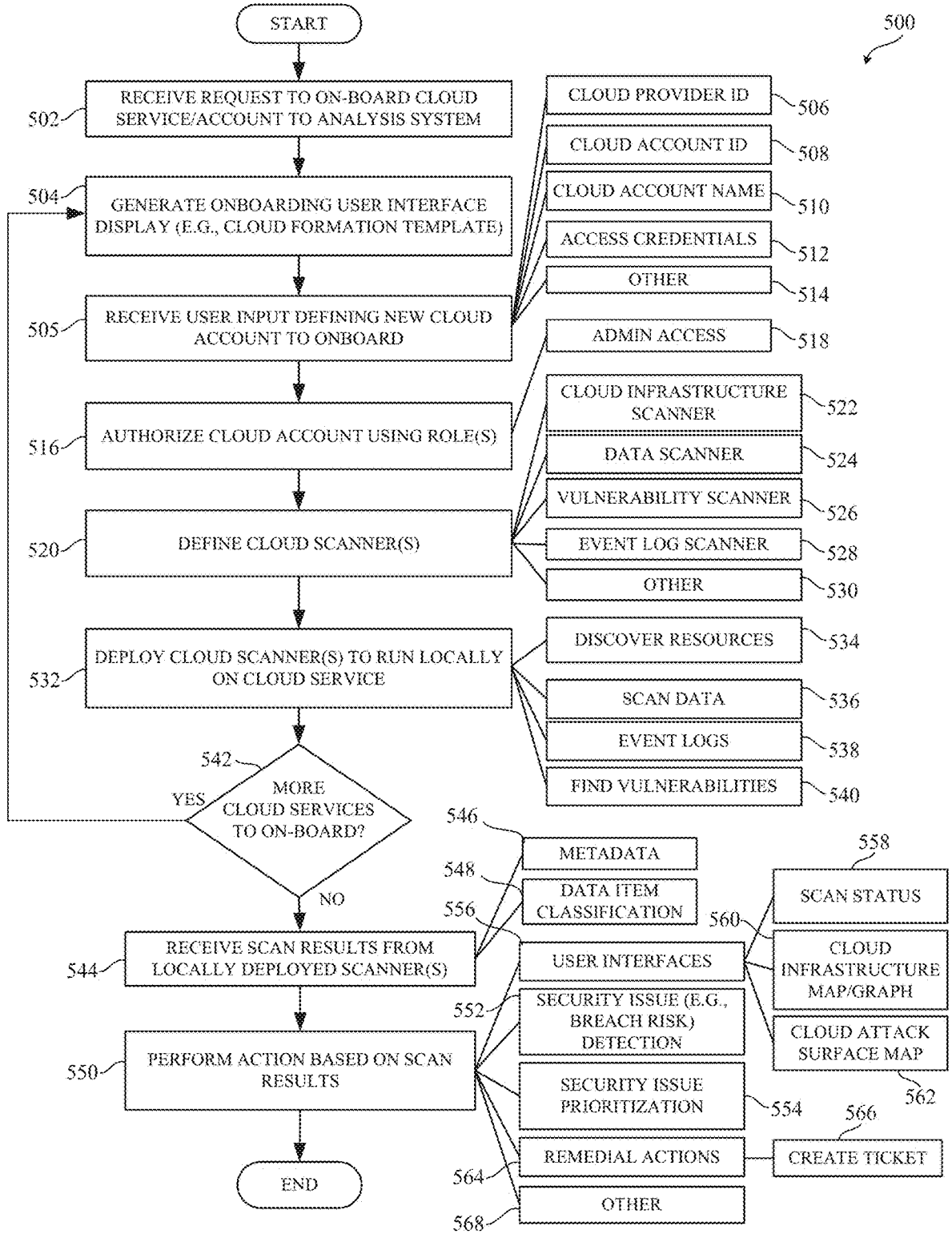
FIG. 5 is a flow diagram showing an example operation of on-boarding a cloud account and deploying one or more scanners.

FIG. 5 is a flow diagram 500 showing an example operation of system 122 in on-boarding a cloud account and deploying one or more scanners. At block 502, a request to on-board a cloud service to cloud security posture analysis system 122 is received. For example, an administrator can submit a request to on-board cloud service 103-1.

At block 504, an on-boarding user interface display is generated. At block 505, user input is received that defines a new cloud account to be on-boarded. The user input can define a cloud provider identification 506, a cloud account identification 508, a cloud account name 510, access credentials to the cloud account 512, and can include other input 514 defining the cloud account to be on-boarded.

At block 516, the cloud account is authorized using roles. For example, administrator access (block 518) can be defined for the cloud scanner using IAM roles. One or more cloud scanners are defined at block 520 and can include, but are not limited to, cloud infrastructure scanners 522, cloud data scanners 524, vulnerability scanners 526, event log scanners 528, or other scanners 530.

At block 532, the cloud scanners are deployed to run locally on the cloud service, such as illustrated in FIG. 2. The cloud scanners discover resources at block 534, scan data in the resources at block 536, event logs at block 538, and can find vulnerabilities at block 540. As discussed in further detail below, a vulnerability can be identified based on finding a predefined risk signature in the cloud service resources. The risk signatures can be queried upon, and define expected behavior within the cloud service and locate anomalies based on this data.

At block 542, if more cloud services are to be on-boarded, operation returns to block 504. At block 544, the scan results from the deployed scanners are received. As noted above, the scan results include metadata (block 546) and/or data item classifications (block 548) generated by the scanners running locally on the cloud service.

At block 550, one or more actions are performed based on the scan results. At block 552, the action includes security issue detection. For example, a breach risk on a particular resource (such as a storage resource storing sensitive data) is identified. At block 554, security issue prioritization can be performed to prioritize the detected security issues. Examples of security issue detection and prioritization are discussed in further detail below. Briefly, security issues can be detected by executing a query against the scan results using vulnerability or risk signatures.

The risk signatures identify criterion such as accessibility of the resources, access and/or permissions between resources, and data types in accessed data stores. Further, each risk signature can be scored and prioritized based on impact. For example, a risk signature can include weights indicative of likelihood of occurrence of a breach and impact if the breach occurs.

A risk signature can be defined based upon any of a wide variety of criteria. For example, a risk signature can identify one or more configurations or settings of compute resources 130. Examples include, but are not limited to, a configuration that indicates whether the compute resource provides accessibility to a particular type of data, such as confidential data, medical data, financial data, personal data, or any other type of private and/or sensitive content. In another example, a risk signature indicates that a compute resource is publicly accessible, includes a public Internet protocol (IP) address, or has IP forwarding enabled. In another example, a risk signature indicates that a compute resource has monitoring disabled, has no IAM role assigned to the compute resource, has backup disabled, data encryption disabled, and/or a low or short backup retention policy. Also, a risk signature can identify password policies set for the compute resource. For instance, a risk signature can indicate a lack of minimum password policies, such as no minimum password length, no requirement of symbols, lowercase letters, uppercase letters, numbers, or password reuse policy. Also, a risk criterion can indicate a location of the compute resource, such as whether the compute resource is located outside of a particular region.

Risk signatures can also indicate configurations and/or settings of storage resources 132. For example, the configurations and settings can indicate authentication or permissions enforced by the storage resource, such as whether authentication is required for read, write, delete, synchronization, or any other operation. Also, the risk signature can indicate whether multi-factor authentication is disabled for the storage resource, as well as a breadth of permissions grants (e.g., whether all authenticated users are granted permissions within the storage resource). Also, a risk signature can indicate whether encryption is enabled by default, a password policy enforced by the storage resource, whether the storage resource is anonymously accessible, publicly accessible, has a key management service disabled, has logging disabled, life cycle management disabled, whether the storage resource is utilized for website hosting, has geo-restriction disabled, or has backup functionality disabled. Also, the risk signature can indicate a type of data stored by the storage resource, such as the examples discussed above.

The action can further include providing user interfaces at block 556 that indicate the scan status (block 558), a cloud infrastructure representation (such as a map or graph) (block 560), and/or a cloud attack surface representation (map or graph) (block 562). The cloud attack surface representation can visualize vulnerabilities.

Remedial actions can be taken at block 564, such as creating a ticket (block 566) for a developer or other user to address the security issues. Of course, other actions can be taken at block 568. For instance, the system can make adjustments to cloud account settings/configurations to address/remedy the security issues.

Figure 6:
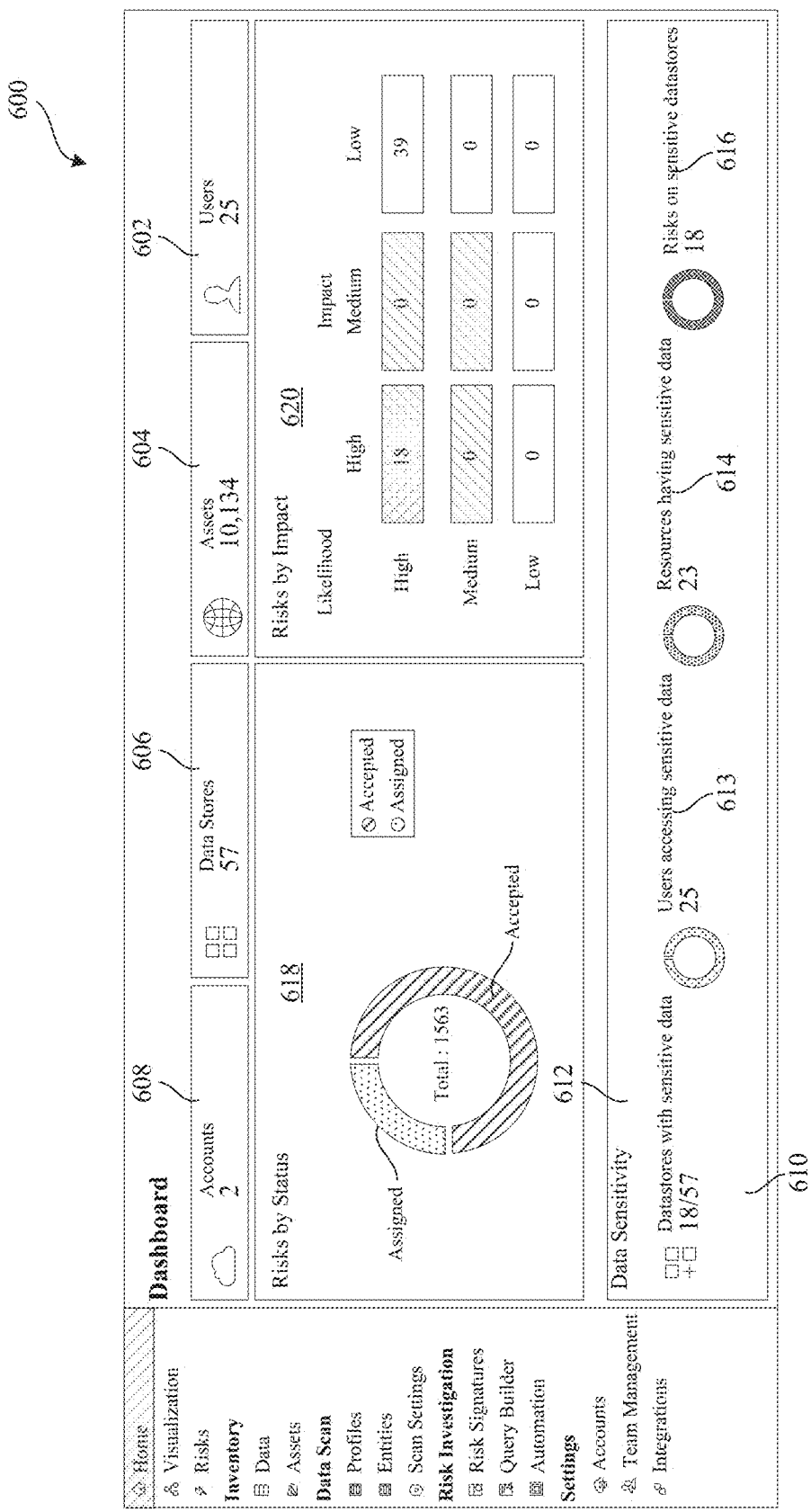
FIG. 6 illustrates one example of a user interface display having a dashboard representing on-boarded cloud service accounts.

FIG. 6 illustrates one example of a user interface display 600, that can be displayed at block 552. Display 600 provides a dashboard for a user which provides an overview of on-boarded cloud service accounts. The dashboard identifies a number of users 602, a number of assets 604, a number of data stores 606, and a number of accounts 608. A data sensitivity pane 610 includes a display element 612 that identifies a number of the data stores that include sensitive data, a display element 613 that identifies a number of users with access to the sensitive data, a display element 614 that identifies a number of resources having sensitive data, and a display element 616 that identifies a number of risks on the data stores having sensitive data. Further, graphs or charts can be generated to identify those risks based on factors such as status (display element 618) or impact (display element 620).

Display element 620 illustratively categorizes the risks based on impact as well as the likelihood of occurrence of those risks. Risk categorization is discussed in further detail below. Briefly, however, display element 620 stratifies one or more of breach likelihood scores or breach impact scores categories representing different levels of severity, such as high, medium, and low severity levels. In one example, display element 620 is color coded based on the degree of impact of the risk (e.g., high impact is highlighted in red, medium impact is highlighted in yellow, and low impact is highlighted in green).

Figure 7:
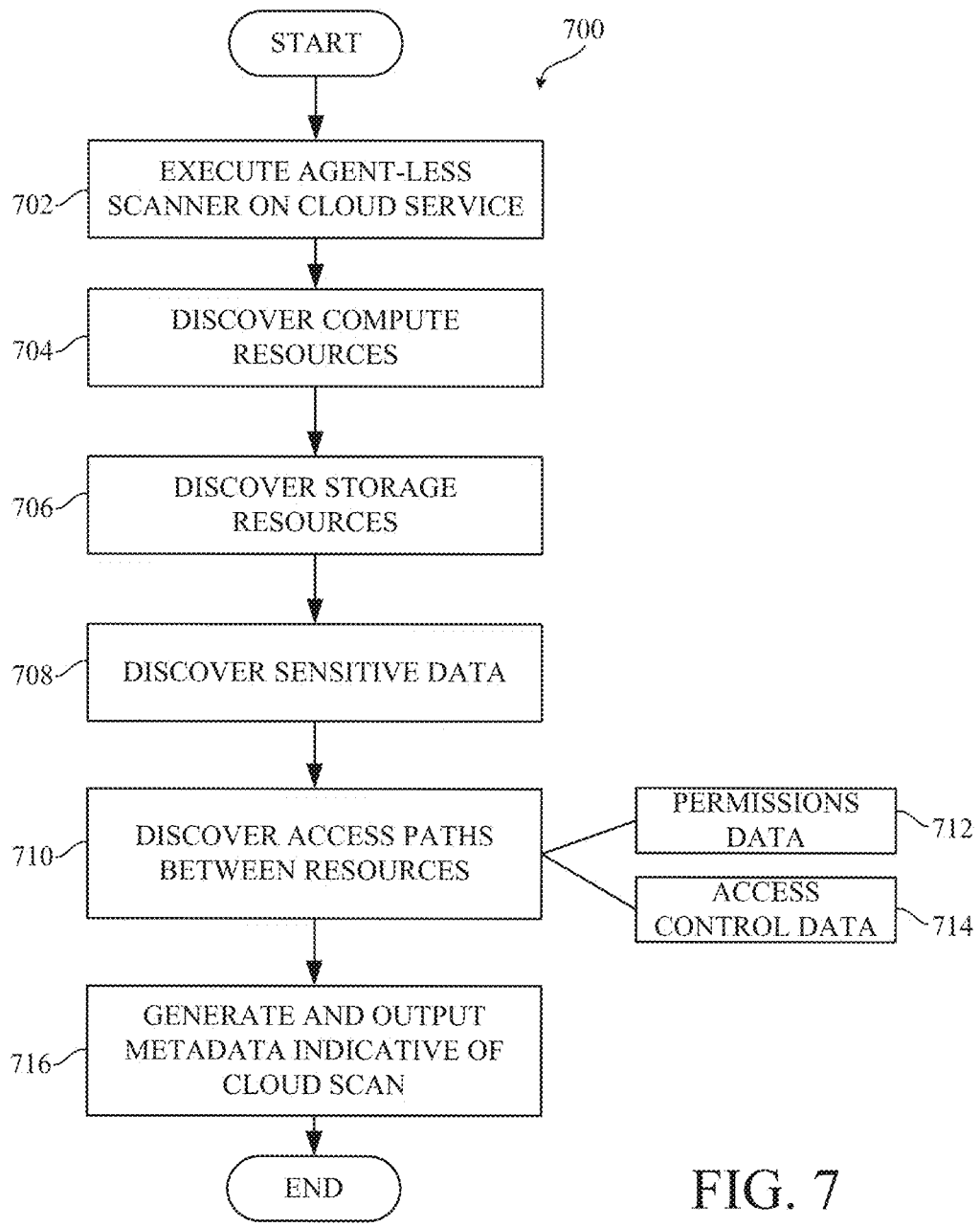
FIG. 7 is a flow diagram illustrating one example of cloud infrastructure scanning performed by a cloud scanner deployed in a cloud service.

FIG. 7 is a flow diagram 700 illustrating one example of cloud infrastructure scanning performed by cloud scanner 148 deployed in cloud service 103-1. At block 702, an agent-less scanner is executed on the cloud service. For example, a compute resource can utilize a serverless function to perform a scan on the cloud service.

At block 704, the scanner discovers the compute resources 130 and, at block 706, the storage resources 132.

Sensitive data can be discovered at block 708. The agent-less scanner does not require a proxy or agent running in the cloud service, and can utilize server-less containers and resources to scan the documents and detect sensitive data. The data can be accessed using APIs associated with the scanners. The sensitive data can be identified using pattern matching, such as by querying the data using predefined risk signatures.

At block 710, access paths between the resources are discovered based on permissions data 136 (block 712), and/or access control data 138 (block 714). A rule processing engine, such as using JSON metadata, can be utilized to analyze the roles and policies, and can build access relationships between the nodes representing the resources. The policies can be decoded to get access type (allow, deny, etc.) and the policy can be placed in a node to link from a source to target node and create the access relationship. At block 716, metadata indicative of the scanning results is generated and outputted by metadata output component 272.

Figures 1, 8:
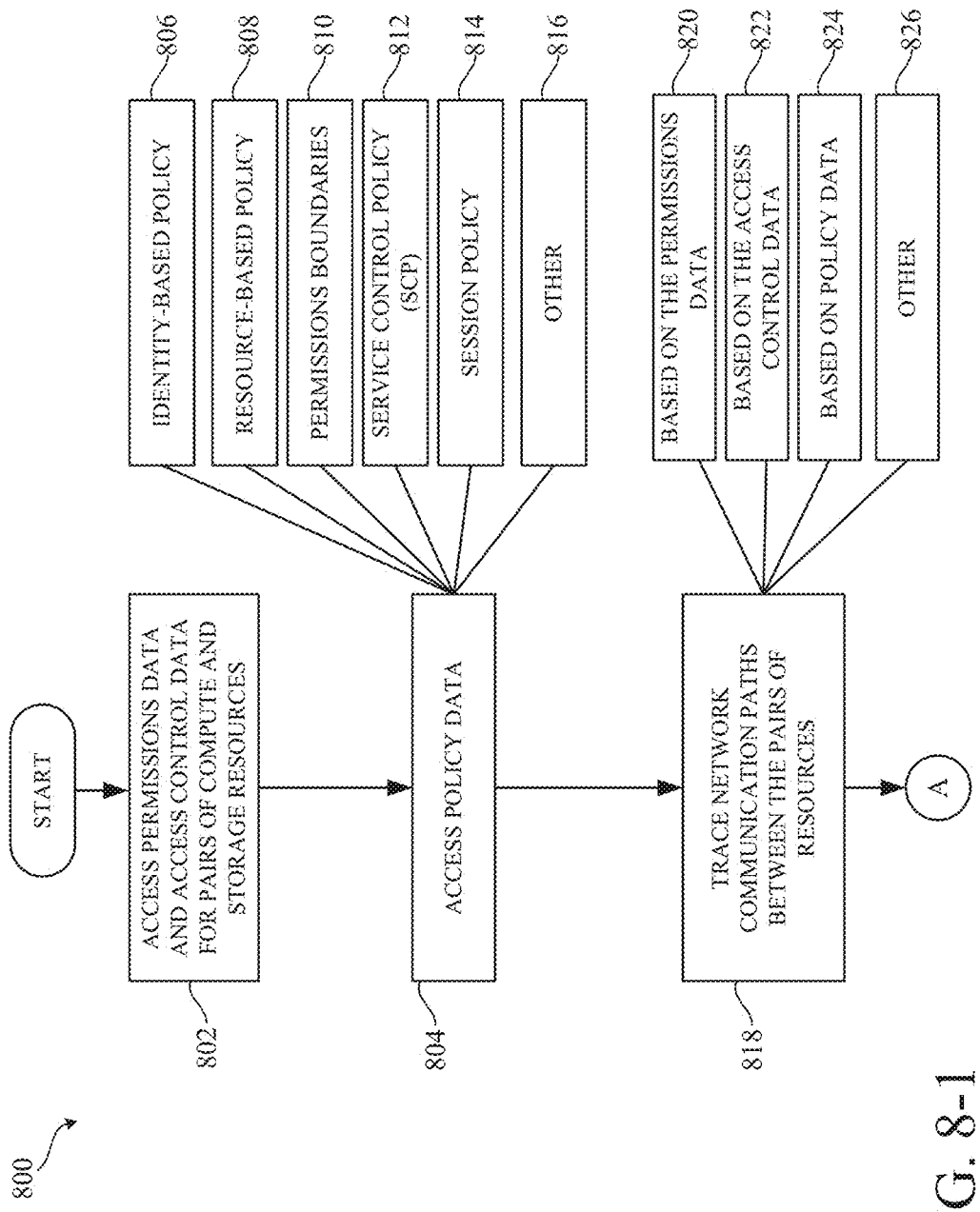
Figures 2, 8:
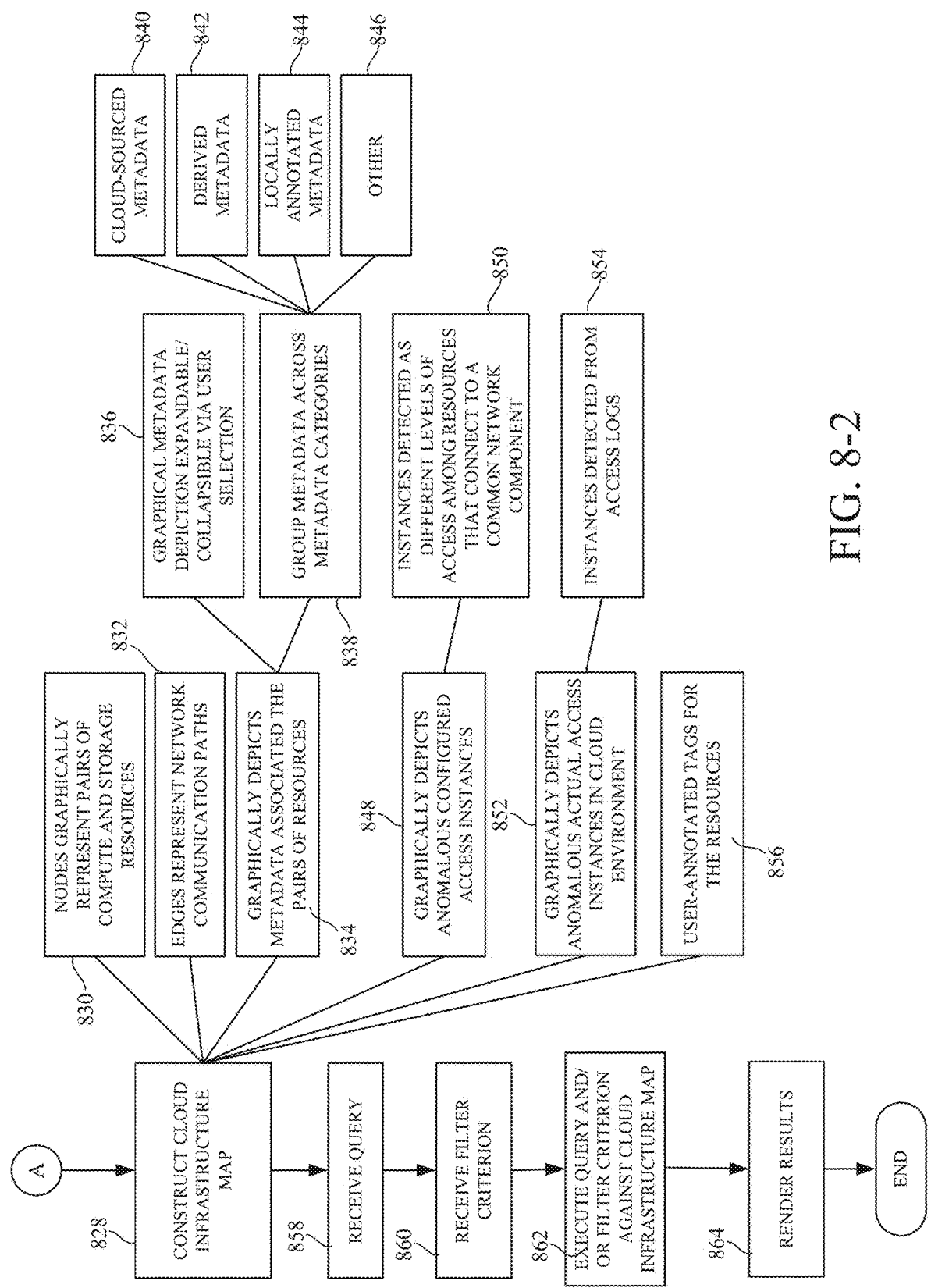

FIGS. 8-1 and 8-2 (collectively referred to as FIG. 8) provide a flow diagram 800 illustrating one example of infrastructure analysis and query execution. At block 802, permissions data and access control data for pairs of compute and storage resources is accessed. Policy data is accessed at block 804. For example, the policy data can include identity-based policies (block 806), resource-based policies (block 808), permissions boundaries (block 810), service control policies (SCP) (block 812), session policies (block 814) as well as other policies (block 816).

At block 818, network communication paths are traced between the pairs of resources. Tracing the network communication path can be based on the permissions data at block 820, the access control data at block 822, the policy data at block 824, and/or other data at block 826.

At block 828, a cloud infrastructure map is constructed. An example of a cloud infrastructure map includes nodes that graphically represent pairs of compute and storage resources (block 830), and edges that represent network communication paths between the resources (block 832). At block 834, the map graphically depicts metadata associated with the pairs of resources. For example, a graphical metadata depiction is expandable or collapsible via user selection, as represented at block 836. The metadata can be grouped across metadata categories at block 838, such as based on cloud-sourced metadata at block 840, derived metadata at block 842, locally annotated metadata at block 844, or based on other metadata categories at block 846.

The cloud infrastructure map can also graphically depict anomalous configured access instances at block 848. For example, block 848 can detect different levels of access among resources that connect to a common network component, as represented at block 850. At block 852, the map graphically depicts anomalous actual access instances in the cloud environment. For instance, the instances can be detected from access logs at block 854. User annotated tags for the resources can be depicted in the map at block 856 as well.

At block 858, a query is received. The query can include a search term, a content category, a data privacy policy, a temporal period, and can include other items as well.

Alternatively, or in addition, a filter criterion is received can be received at block 860. The filter criterion can be based on the metadata, based on applications running on at least one pair of resources, and/or based on one or more networks in the cloud environment.

The query and/or filter criterion are executed at block 862 and results are returned at block 864. For example, the query results can identify a subset of the pairs of resources that contain searched content.

Figure 9:
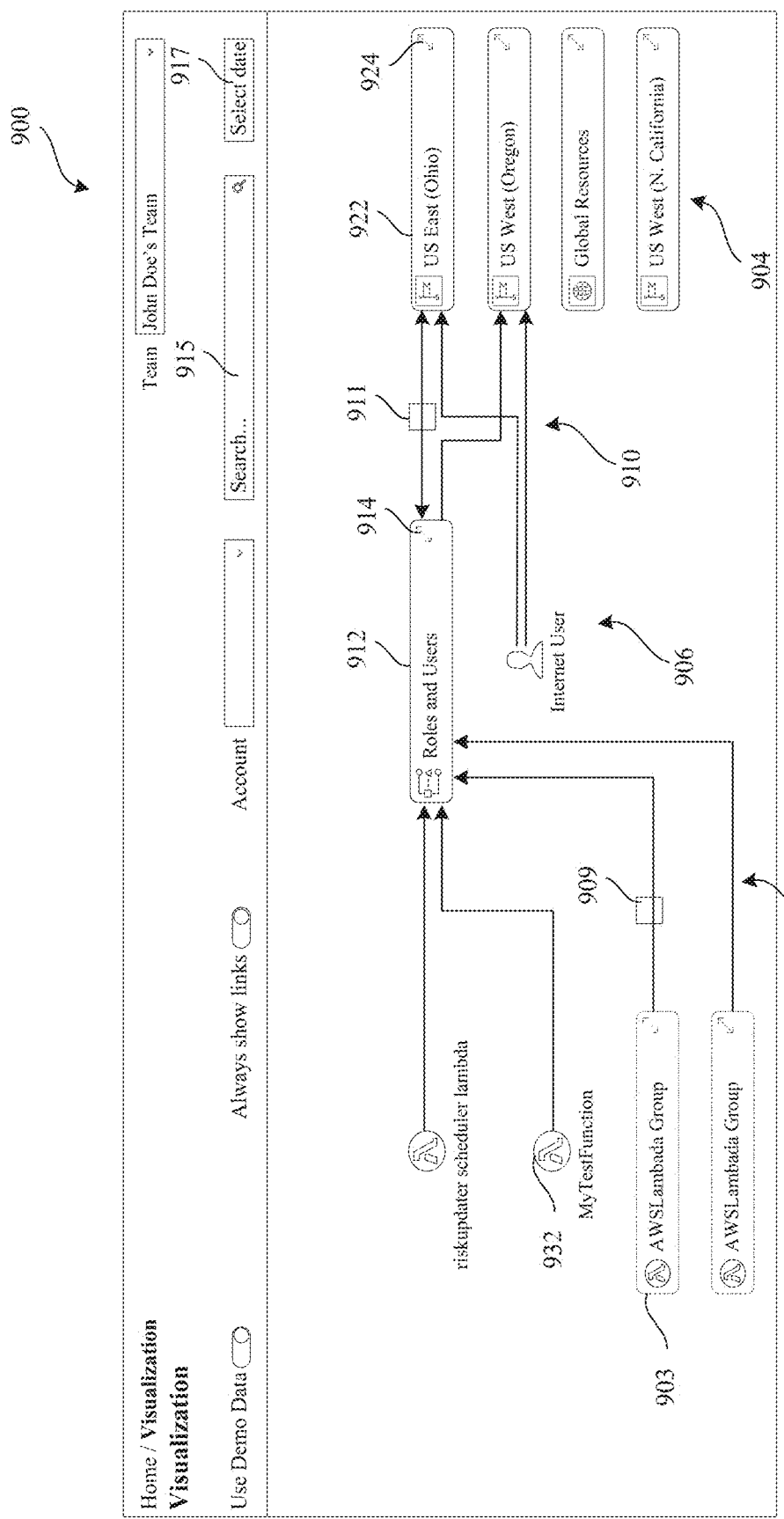
FIG. 9 illustrates an example user interface display.

FIG. 9 illustrates a user interface display 900 that includes a visualization of cloud infrastructure assets and relationships between those assets, such as access communication paths. The visualization in FIG. 9 can be rendered as a cloud infrastructure graph (e.g., map) that shows relationships between compute and storage resources and/or mappings between users, roles, and resources, based on the permissions data and the access control data. Further, the visualization can be augmented using sensitivity classification data to represent propagation of breach attack along communication paths.

As shown in FIG. 9, nodes 902 represent compute resources and nodes 904 represent storage resources. Illustratively, the storage resources include data stores or buckets within a particular cloud service. Nodes 906 represent roles and/or users. The links (e.g., access paths) or edges 908 between nodes 902 and 906 represent that compute resources that can access the particular roles represented by nodes 906. The edges or links 910 represent the storage resources that can be accessed by the particular roles or users represented by nodes 906.

Based on these relationships between compute and storage relationships, display elements can be rendered along, or otherwise visually associated with, the edges 908 and/or 910, to identify and graphically depict the propagation of breach attack. For instance, vulnerability display elements can be rendered in association with edges 908 and/or 910 to identify that a subject vulnerability signature (e.g., one or more risk signatures shown in FIG. 9) has been identified in the data, based on querying the permissions and access control data using the subject vulnerability signature. For example, display element 909 represents a risk signature between nodes 903 and 912 and display element 911 represents (such as by including a description, icon, label, etc.) a risk signature between nodes 912 and 922. Each display element 909, 911 can represent (such as by including a description, icon, label, etc.) corresponding likelihood and impact scores, can be actuatable to render details of the subject vulnerability, such as in a display pane on display 900. The details can include which risk signature has been matched, which sensitive data is at risk, etc.

Figure 10:
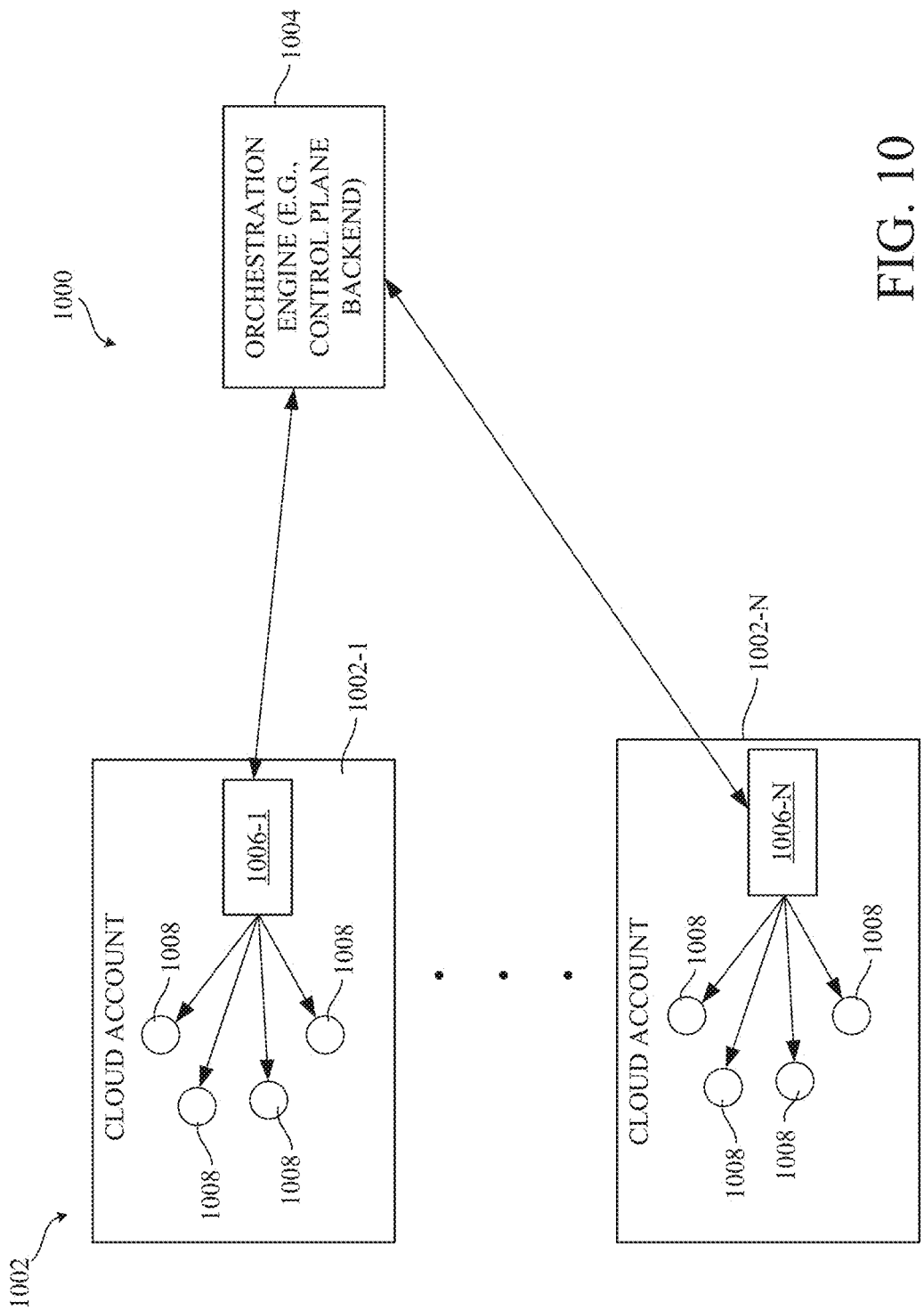
FIG. 10 is a schematic diagram of a cloud environment including a plurality of cloud accounts.

FIG. 10 is a schematic diagram of a cloud environment 1000 including a plurality of cloud accounts 1002-1, 1002-N (collectively referred to as cloud accounts 1002). An orchestration engine 1004 is configured by orchestration engine configuration component 254. In one example, cloud environment 1000 is a multi-cloud environment, where cloud accounts 1002 are provided across a plurality of different cloud providers.

Orchestration engine 1004 is configured to deploy event log scanners on the cloud accounts. For example, one or more event log scanners (represented by block 1006-1) can be deployed on cloud account 1002-1 and one or more event log scanners (represented by block 1006-N) can be deployed on cloud account 1002-N. Each event log scanner is configured to scan one or more event logs 1008, and to return metadata to orchestration engine 1004 representing the events detected in the event logs.

Figure 11:
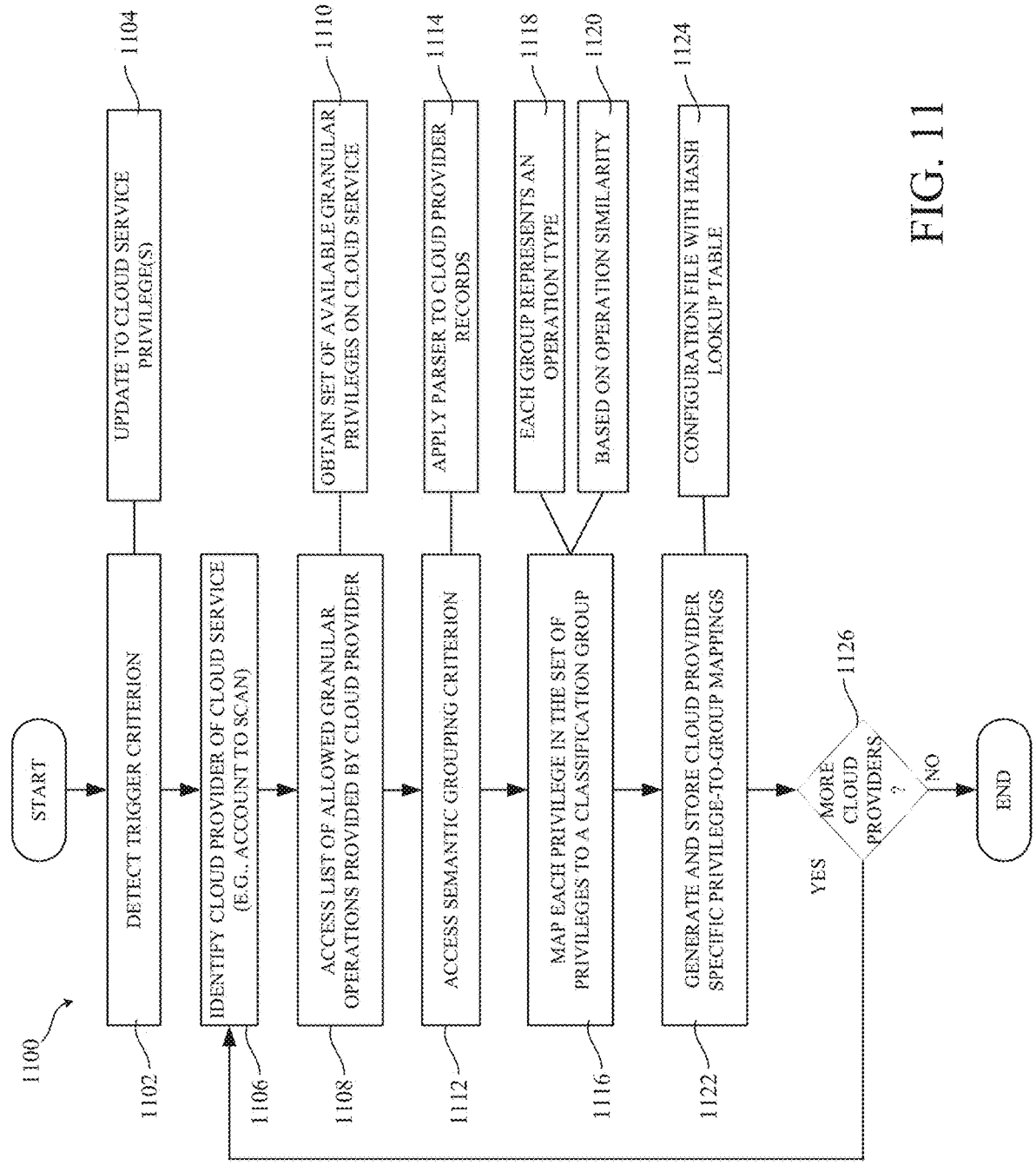
FIG. 11 is a flow diagram illustrating one example of identifying privileges granted in a cloud service and creating classification groupings from the privileges.

FIG. 11 is a flow diagram 1100 illustrating one example of identifying privileges granted in a cloud service and creating classification groupings from those privileges.

At block 1102, a trigger criterion is detected. For example, the trigger criterion can include detecting an update to the cloud service privileges at block 1104. At block 1106, the cloud provider of the cloud service (e.g., the cloud account to scan) is identified, and a list of allowed granular operations provided by that cloud provider is accessed at block 1108. For example, block 1108 can include obtaining a set of available granular privileges on the cloud service at block 1110. In one example, block 1108 includes policy scanner 259 accessing and scanning policies 140 to identify all privileges that are granted within a given cloud account.

At block 1112, a classification grouping criterion is accessed. For example, block 1112 can include applying a parser to cloud provider records at block 1114, to identify groups of similar operations to which the privileges are directed.

For sake of illustration, assume the set of available granular privileges includes a first granular privilege to enlist or enumerate a storage bucket (e.g., an S3 bucket) and a second granular privilege to read the storage bucket. The classification grouping criterion can indicate that the first and second granular privileges are to be grouped into a semantic category "CAN_READ", as the operations for both privileges are directed to read operations on an S3 bucket.

At block 1116, each granular privilege in the set of granular privileges is mapped to a privilege classification group (or semantic group), based on the semantic grouping criterion. A subset of the granular privileges can be grouped into a classification group based on a threshold similarity to a target computing action. For example, the abovementioned granular privileges enlist or enumerate a storage bucket and read the storage bucket can be grouped into a classification group representing the target computing action "CAN_READ". In this way, each group can represent an operation type (e.g., read operations, write operations, etc.), as represented at block 1118. In one example, the mapping is based on operation similarity, as represented at block 1120.

In one illustrative example, a particular cloud account includes 2000 individual granular privileges to perform operations within that cloud account. The process of semantically grouping the two thousand granular permissions into six semantically grouped permission categories. Each of the semantic groups is labeled with a classification group identifier (e.g., "CAN_READ", CAN_WRITE", etc.).

At block 1122, cloud provider-specific privilege-to-group mappings are generated and stored. For example, this can include creating a configuration file with a hash lookup table at block 1124. The mappings generated at block 1122 indicate how instances of specific granular privileges are to be mapped into the classification groups, discussed above. At block 1126, the operation determines whether there are additional cloud providers to analyze.

Figure 12:
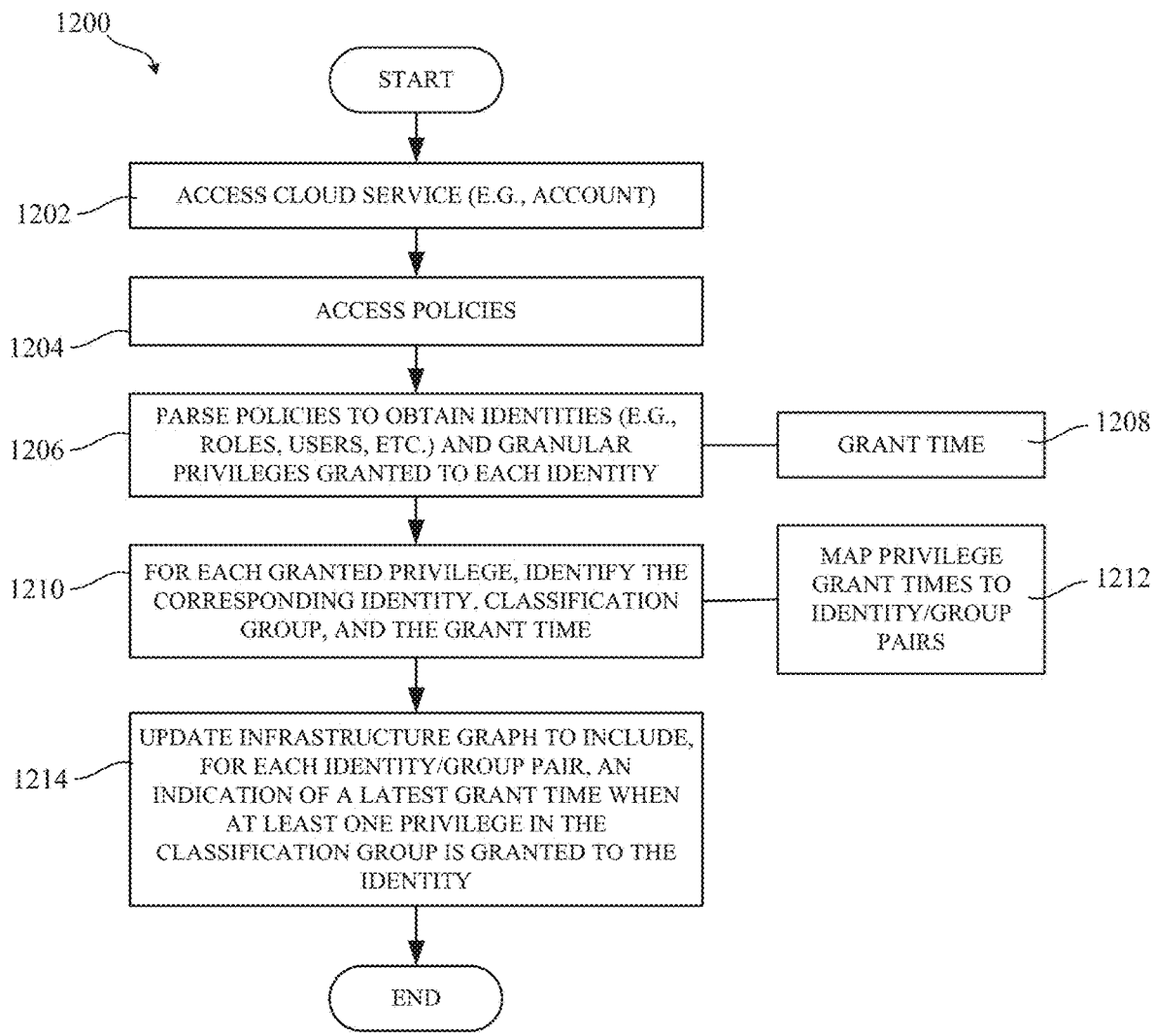
FIG. 12 is a flow diagram of identifying privileges granted in a particular cloud service.

FIG. 12 is a flow diagram 1200 of identifying privileges granted in a particular cloud service. At block 1202, the cloud service is accessed and, at block 1204, one or more policies (e.g., policies 140 shown in FIG. 2) are accessed. At block 1206, the policies are parsed to obtain identities and granular privileges that are granted to those entities. For each granted privilege, a timestamp indicating a grant time is identified, as represented at block 1208.

At block 1210, for each granted privilege, the corresponding identity (e.g., user, role, etc.), classification group, and the grant time is identified. For example, block 1210 includes identifying a given granular privilege granted in a policy, and mapping that granular privilege at block 1212 to one an identity/group, based on the mappings stored at block 1122 discussed above.

At block 1214, an infrastructure graph is updated to include, for each identity/group pair, an indication a latest grant time when at least one privilege in the classification group was granted to the identify. Updating the infrastructure graph can include adding nodes and edges in the infrastructure graph to identify the granted privilege and the timestamp indicating the time of the privilege grant, between respective identities and resources. In one example, nodes represent subject identities and subject resources, and edges represent the set of grant times.

Figures 1, 13:
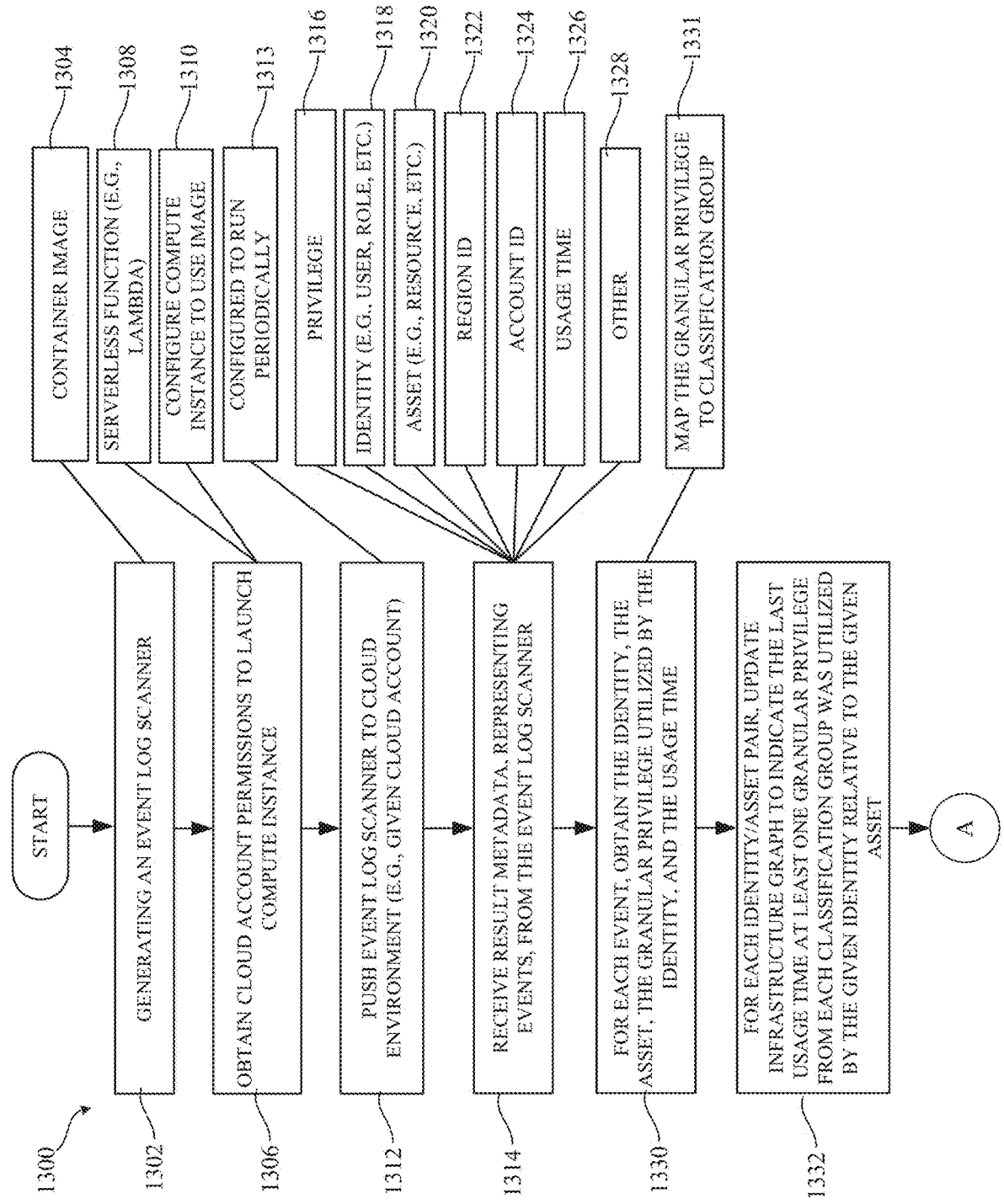
Figures 2, 13:
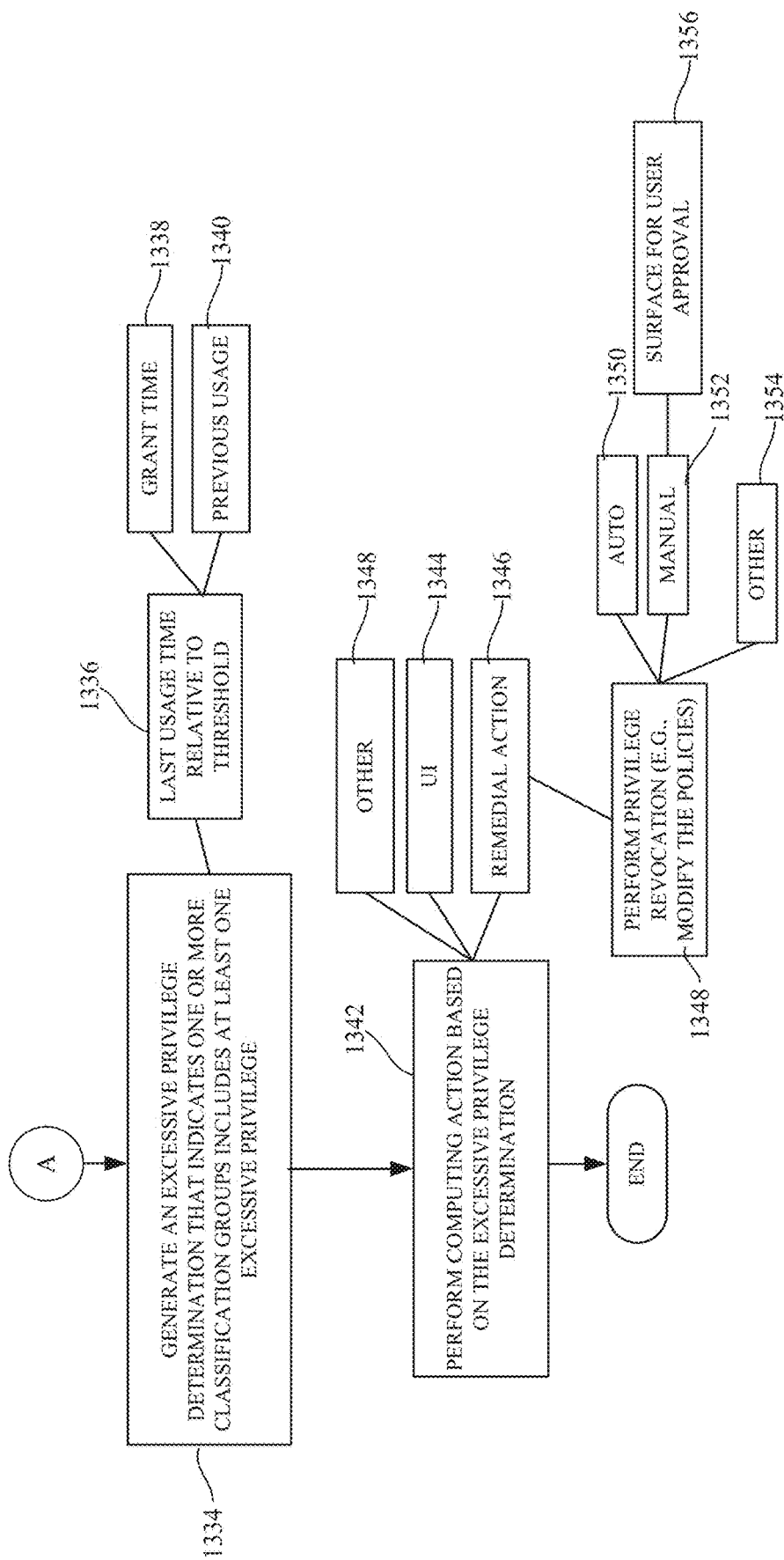

FIG. 13 is a flow diagram 1300 illustrating an example operation of scanning event logs to identify privilege usage within a cloud service.

At block 1302, an event log scanner is generated. One example includes creating and deploying a container image at block 1304.

At block 1306, cloud account permissions are obtained to launch a compute instance. The compute instance can include a serverless function, such as a lambda service, as represented at block 1308. Further, the compute instance can be configured to use the container image at block 1310.

At block 1312, the event log scanner is pushed to the cloud environment, and can be configured to run periodically as illustrated at block 1314. In this way, the event log scanner can identify new event log entries as additional events are detected within the cloud environment.

At block 1314, result metadata is received from the event log scanner. The result metadata can include, but is not limited to, metadata indicating a particular privilege (block 1316), an identity (block 1318), an asset (block 1320), a region identifier (block 1322), an account ID (block 1324), a timestamp (block 1326), and can include other metadata (block 1328).

Illustratively, the time metadata at block 1326 indicates a usage time at which a particular entity (identified by the identity metadata) accessed a particular asset identified by the asset metadata, using the privilege identified by the privilege metadata.

At block 1330, for each event, the identity, the asset, and the granular privilege, and the usage time are obtained. At block 1331, the granular privilege can be mapped to a particular classification group. For sake of illustration, assume that a bucket read privilege is utilized by a first identity to access a first asset. In this case, the privilege is mapped to the "CAN_READ" group, to indicate that a read operation was performed by the first identity relative to the first asset.

At block 1332, for each identity/asset pair, the infrastructure graph is updated to indicate a last or latest usage time at least one privilege from each classification group was utilized by the given identity relative to the given asset. In the above example, the infrastructure graph is updated to indicate that a "CAN_READ" operation was performed, by creating and/or updating nodes and/or edges in the graph.

Block 1334 generates an excessive privilege determination that indicates one or more of the classification groups includes at least one excessive privilege. For example, the determination that a classification group includes an excessive privilege can be made based on the last usage time of privileges in the classification group relative to a threshold, as represented at block 1336. The threshold can include, but is not limited to, the grant time of the privilege(s) in the classification group (block 1338) and/or a previous usage time of the privilege(s) in the classification group (block 1340). In this way, block 1334 can identify excessive privileges on a group-by-group basis, as opposed to at the granular privilege level.

At block 1342, a computing action can be performed based on the excessive privilege determination. For example, a user interface can be generated at block 1344 to render an identification of the classification groups that have excessive privileges. In this way, the user interface can identify excessive privileges using the semantic groupings, which, compared to the granular privileges, are more semantically meaningful to a user. Alternatively, or in addition, a remedial action can be performed at block 1346, or other actions can be performed at block 1348.

In one example of a remedial action, at block 1348 a privilege revocation is performed. An example includes modifying the policies 140 to remove the excessive privileges from the granted privileges within the cloud account. This can be done automatically, as represented at block 1350, manually at block 1352, or in other ways at block 1354. For example, at block 1356, the excessive privileges can be surfaced on a user interface for user approval of their revocation.

Figure 14:
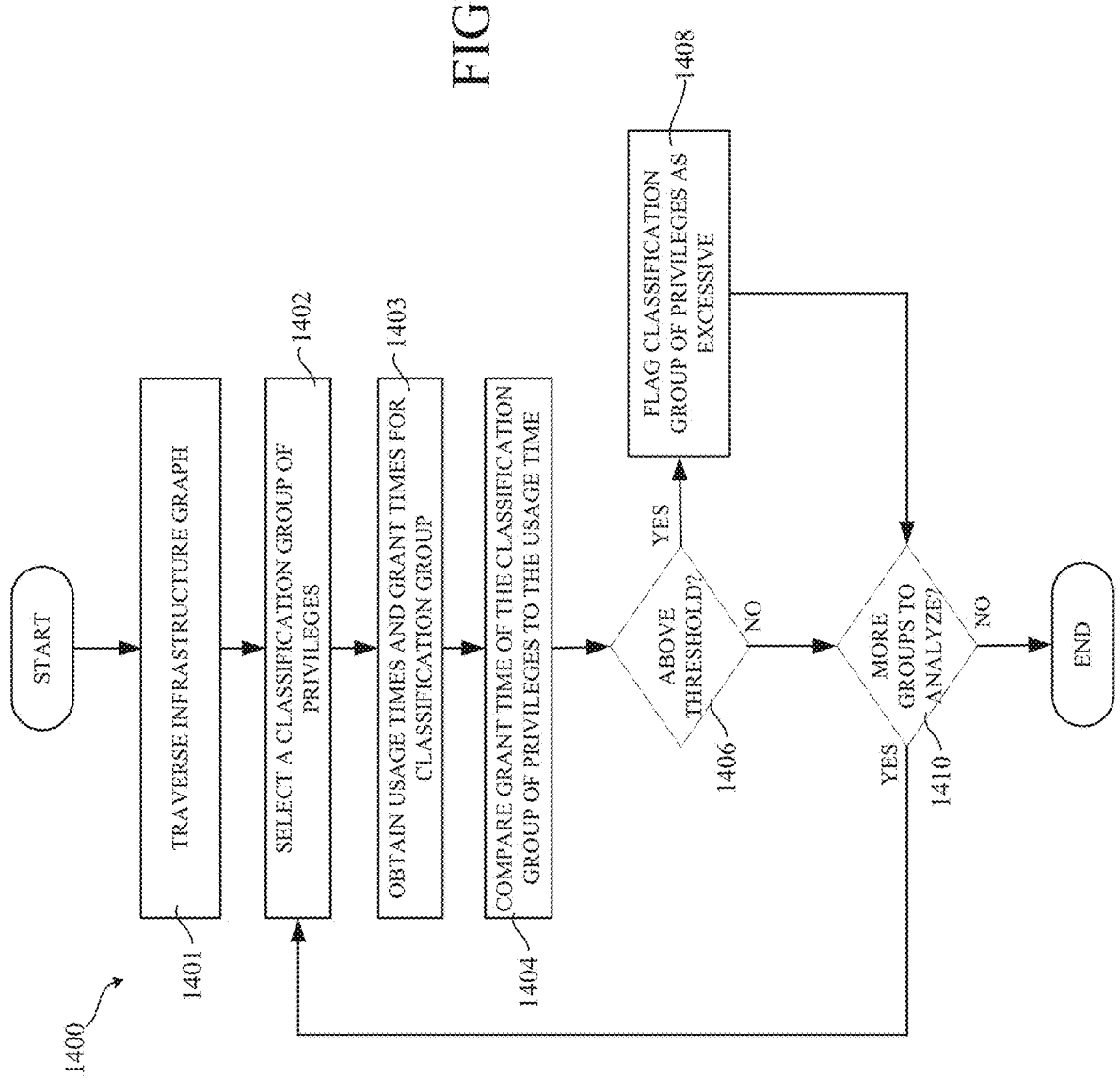
FIG. 14 is a flow diagram illustrating an example operation of identifying excessive privileges.

FIG. 14 is a flow diagram 1400 illustrating an example operation of identifying excessive privileges, for example based on the infrastructure graph updated as discussed above.

At block 1401, the infrastructure graph is traversed and, at block 1402, a classification group of privileges is selected. In the above example, six classification groups are created for a collection of two thousand privileges within a given cloud account. In this case, a first one of the six classification groups is selected at block 1402.

At block 1403, the privilege grant and usage times for the classification groups are obtained. At block 1404, the grant time of the classification group (e.g., when a privilege in the group was granted by the policies 140 in the cloud account) is compared to the last usage time the classification group of privileges was utilized. If, at block 1406, it is determined that the time between the grant and the usage is above a threshold (e.g., the usage time of the privilege occurred more than a threshold time after the grant time of the privilege), the classification group of privileges is flagged as excessive at block 1408. For example, if one or more CAN_READ privileges are granted to a user, but the privileges are not used for thirty days, block 1408 flags the read privileges as being excessive, that is the read privileges are considered not to be needed based on the historical usage.

At block 1410, the operation determines whether there are additional groups to analyze. If so, operation returns to block 1402.

It can thus be seen that the present disclosure provides technology for data security posture analysis of a cloud environment. In described examples, the technology provides systems and methods for identifying excessive privileges to facilitate removal of those excessive privileges, which improves cloud infrastructure security. Additionally, the excessive privilege identification and revocation is done through the classification grouping of privileges, which reduces the computational expense, which improves the computing process through reduced processing load, bandwidth, and storage requirements. The present technology improves the performance and security of cloud infrastructures.

One or more implementations of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

Examples discussed herein include processor(s) and/or server(s). For sake of illustration, but not by limitation, the processors and/or servers include computer processors with associated memory and timing circuitry, and are functional parts of the corresponding systems or devices, and facilitate the functionality of the other components or items in those systems.

Also, user interface displays have been discussed. Examples of user interface displays can take a wide variety of forms with different user actuatable input mechanisms. For instance, a user input mechanism can include icons, links, menus, text boxes, check boxes, etc., and can be actuated in a wide variety of different ways. Examples of input devices for actuating the input mechanisms include, but are not limited to, hardware devices (e.g., point and click devices, hardware buttons, switches, a joystick or keyboard, thumb switches or thumb pads, etc.) and virtual devices (e.g., virtual keyboards or other virtual actuators). For instance, a user actuatable input mechanism can be actuated using a touch gesture on a touch sensitive screen. In another example, a user actuatable input mechanism can be actuated using a speech command.

The present figures show a number of blocks with corresponding functionality described herein. It is noted that fewer blocks can be used, such that functionality is performed by fewer components. Also, more blocks can be used with the functionality distributed among more components. Further, the data stores discussed herein can be broken into multiple data stores. All of the data stores can be local to the systems accessing the data stores, all of the data stores can be remote, or some data stores can be local while others can be remote.

As used herein, if a description includes "one or more of" or "at least one of" followed by a list of example features with a conjunction "or" between the penultimate example feature and the last example feature, then this is to be read such that (1) one example includes at least one of or one or more of each feature of the listed features, (2) another example includes at least one of or one or more of only one feature of the listed features, and (3) another example includes some combination of the listed features that is less than all of the features and more than one of the features.

As used herein, if a description includes "one or more of" or "at least one of" followed by a list of example features with a conjunction "and" between the penultimate example feature and the last example feature, then this is to be read such that the example includes at least one of or one or more of each feature of all the listed features.

As used herein, if a description includes "one or more of" or "at least one of" followed by a list of example features with a conjunction "and/or" between the penultimate example feature and the least example feature, then this is to be read such that, in one example, the description includes "one or more of" or "at least one of" followed by a list of example features with a conjunction "or" between the penultimate example feature and the last example feature, and, in another example, the description includes "one or more of" or "at least one of" followed by a list of example features with a conjunction "and" between the penultimate example feature and the last example feature.

The above discussion has described a variety of different systems, components, logic, and interactions. One or more of these systems, components, logic and/or interactions can be implemented by hardware, such as processors, memory, or other processing components. Some particular examples include, but are not limited to, artificial intelligence components, such as neural networks, that perform the functions associated with those systems, components, logic, and/or interactions. In addition, the systems, components, logic and/or interactions can be implemented by software that is loaded into a memory and is executed by a processor, server, or other computing component, as described below. The systems, components, logic and/or interactions can also be implemented by different combinations of hardware, software, firmware, etc., some examples of which are described below. These are some examples of different structures that can be used to implement any or all of the systems, components, logic, and/or interactions described above.

The elements of the described figures, or portions of the elements, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 15:
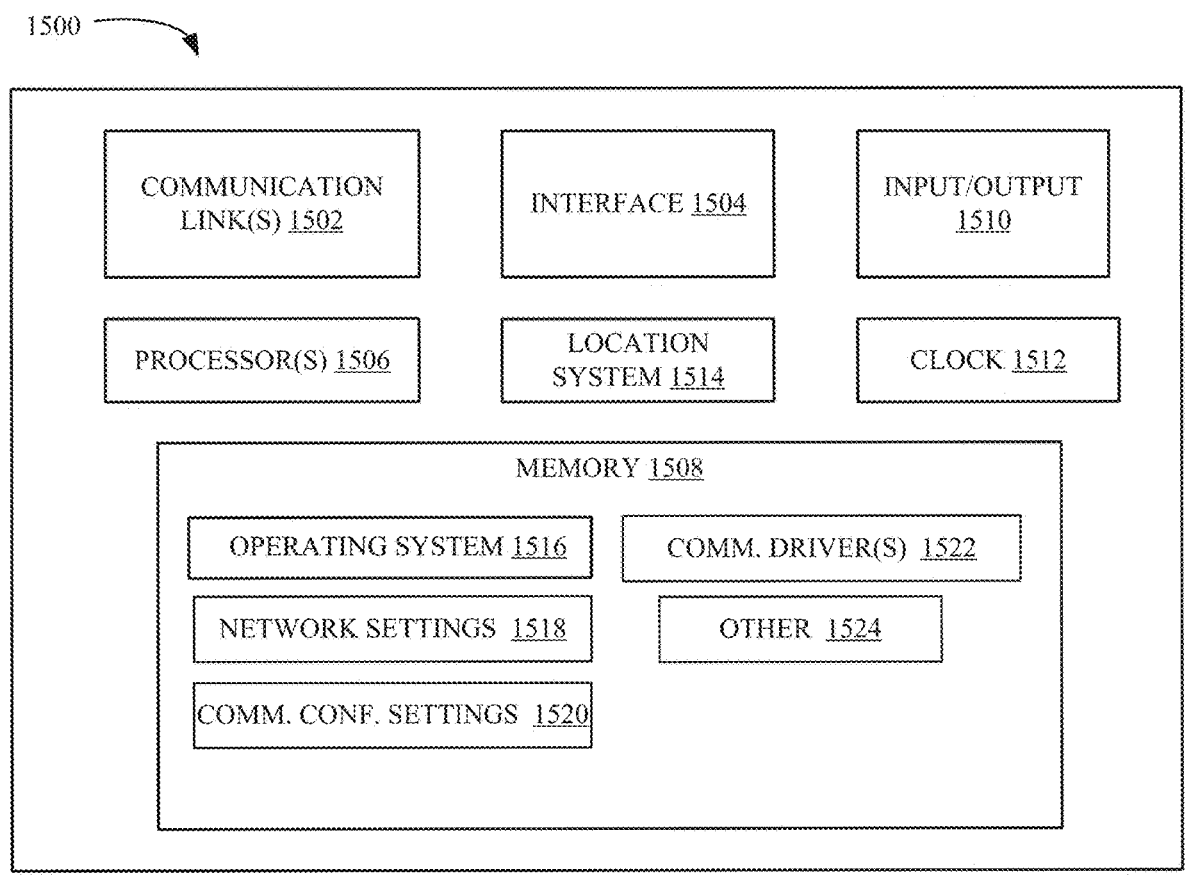
FIG. 15 is a simplified block diagram of one example of a client device.
Figure 16:
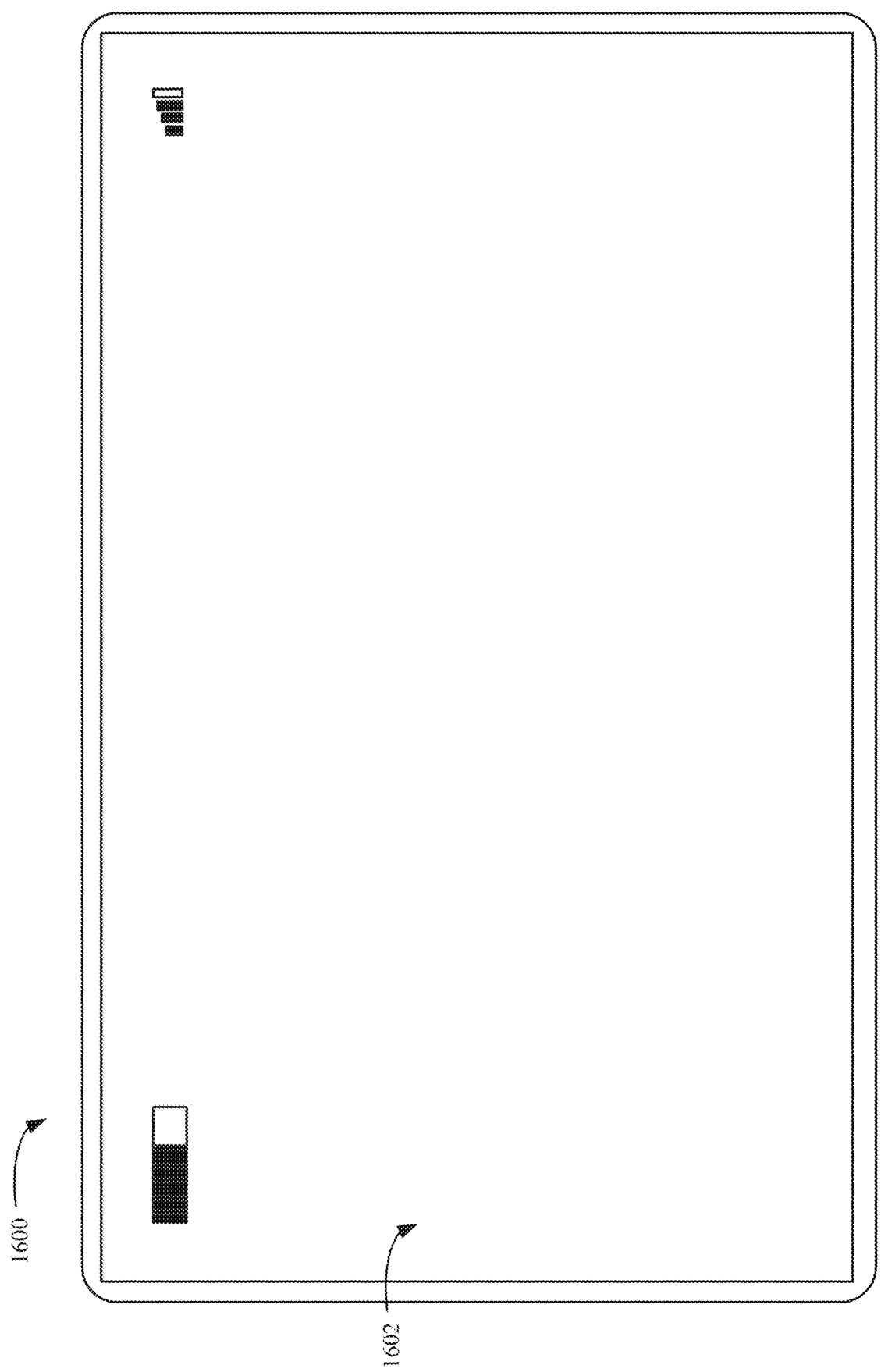
FIG. 16 illustrates an example of a handheld or mobile device.

FIG. 15 is a simplified block diagram of one example of a client device 1500, such as a handheld or mobile device, in which the present system (or parts of the present system) can be deployed. FIG. 16 illustrates an example of a handheld or mobile device.

One or more communication links 1502 allows device 1500 to communicate with other computing devices, and can provide a channel for receiving information automatically, such as by scanning. An example includes communication protocols, such as wireless services used to provide cellular access to a network, as well as protocols that provide local wireless connections to networks.

Applications or other data can be received on an external (e.g., removable) storage device or memory that is connected to an interface 1504. Interface 1504 and communication links 1502 communicate with one or more processors 1506 (which can include processors or servers described with respect to the figures) along a communication bus (not shown in FIG. 26), that can also be connected to memory 1508 and input/output (I/O) components 1510, as well as clock 1512 and a location system 1514.

Components 1510 facilitate input and output operations for device 1500, and can include input components such as microphones, touch screens, buttons, touch sensors, optical sensors, proximity sensors, orientation sensors, accelerometers. Components 1510 can include output components such as a display device, a speaker, and or a printer port.

Clock 1512 includes, in one example, a real time clock component that outputs a time and date, and can provide timing functions for processor 1506. Location system 1514 outputs a current geographic location of device 1500 and can include a global positioning system (GPS) receiver, a LORAN system, a dead reckoning system, a cellular triangulation system, or other positioning system. Memory 1508 stores an operating system 1516, network applications and corresponding configuration settings 1518, communication configuration settings 1520, communication drivers 1522, and can include other items 1524. Examples of memory 1508 include types of tangible volatile and non-volatile computer-readable memory devices. Memory 1508 can also include computer storage media that stores computer readable instructions that, when executed by processor 1506, cause the processor to perform computer-implemented steps or functions according to the instructions. Processor 1506 can be activated by other components to facilitate functionality of those components as well.

FIG. 16 illustrates one example of a tablet computer 1600 having a display screen 1652, such as a touch screen or a stylus or pen-enabled interface. Screen 1602 can also provide a virtual keyboard and/or can be attached to a keyboard or other user input device through a mechanism, such as a wired or wireless link. Alternatively, or in addition, computer 1600 can receive voice inputs.

Figure 17:
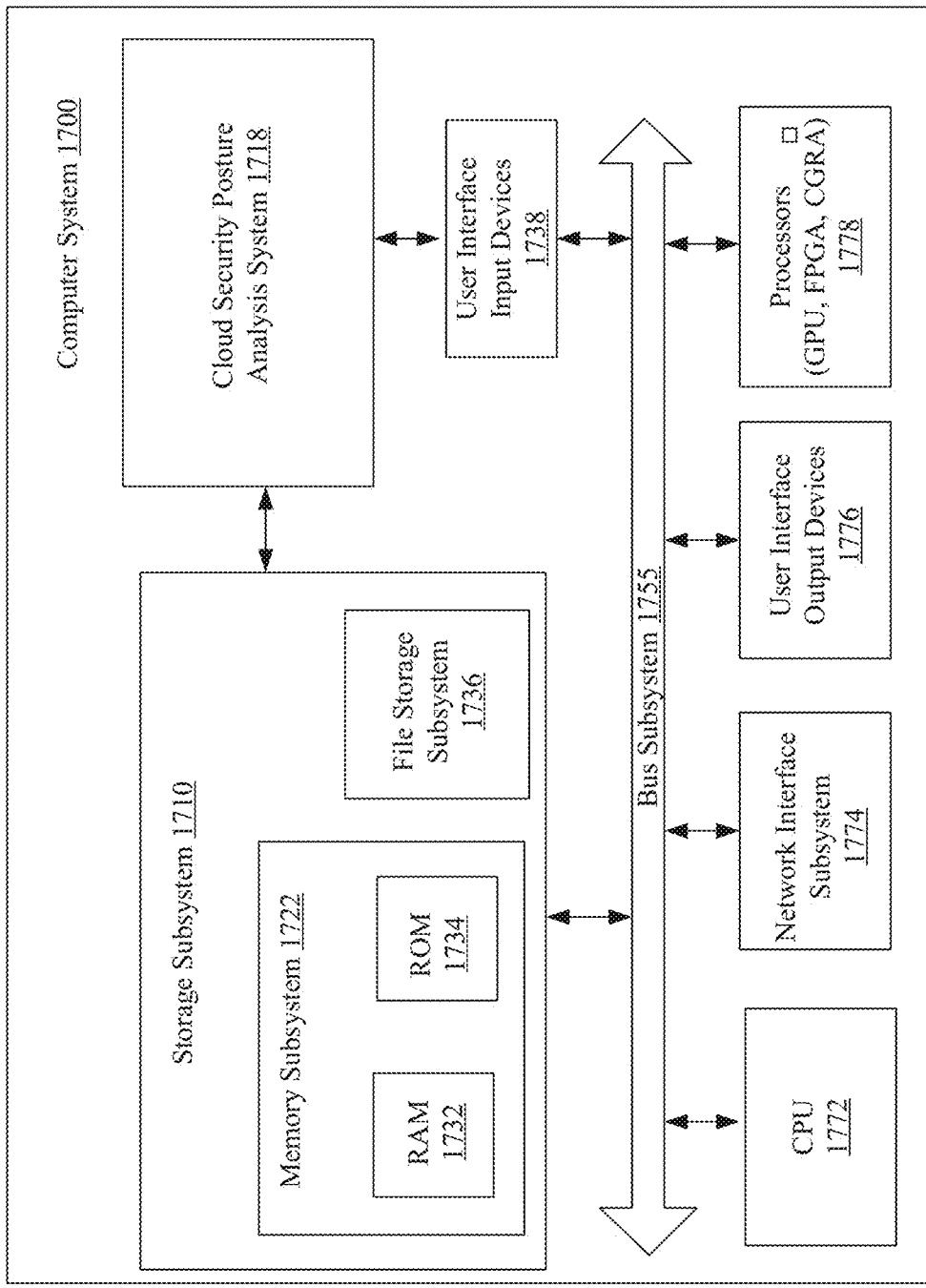
FIG. 17 shows an example computer system.

FIG. 17 shows an example computer system 1700 that can be used to implement the technology disclosed. Computer system 1700 includes at least one central processing unit (CPU) 1772 that communicates with a number of peripheral devices via bus subsystem 1755. These peripheral devices can include a storage subsystem 1710 including, for example, memory devices and a file storage subsystem 1736, user interface input devices 1738, user interface output devices 1776, and a network interface subsystem 1774. The input and output devices allow user interaction with computer system 1700. Network interface subsystem 1774 provides an interface to outside networks, including an interface to corresponding interface devices in other computer systems.

In one implementation, cloud security posture analysis system 1718 is communicably linked to the storage subsystem 1710 and the user interface input devices 1738.

User interface input devices 1738 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1700.

User interface output devices 1776 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1700 to the user or to another machine or computer system.

Storage subsystem 1710 stores programming and data constructs that provide the functionality of some or all of the modules and methods described herein. These software modules are generally executed by processors 1778.

Processors 1778 can be graphics processing units (GPUs), field-programmable gate arrays (FPGAs), application-specific integrated circuits (ASICs), and/or coarse-grained reconfigurable architectures (CGRAs). Processors 1778 can be hosted by a deep learning cloud platform such as Google Cloud Platform™, Xilinx™, and Cirrascale™. Examples of processors 1778 include Google's Tensor Processing Unit (TPU)™, rackmount solutions like GX4 Rackmount Series™, GX50 Rackmount Series™, NVIDIA DGX-1™, Microsoft's Stratix V FPGA™, Graphcore™ Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 1722 used in the storage subsystem 1710 can include a number of memories including a main random access memory (RAM) 1732 for storage of instructions and data during program execution and a read only memory (ROM) 1734 in which fixed instructions are stored. A file storage subsystem 1736 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1736 in the storage subsystem 1710, or in other machines accessible by the processor.

Bus subsystem 1755 provides a mechanism for letting the various components and subsystems of computer system 1700 communicate with each other as intended. Although bus subsystem 1755 is shown schematically as a single bus, alternative implementations of the bus subsystem can use multiple busses.

Computer system 1700 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1700 depicted in FIG. 17 is intended only as a specific example for purposes of illustrating the preferred implementations of the present invention. Many other configurations of computer system 1700 are possible having more or less components than the computer system depicted in FIG. 17.

It should also be noted that the different examples described herein can be combined in different ways. That is, parts of one or more examples can be combined with parts of one or more other examples. All of this is contemplated herein.

The technology disclosed can be practiced as a system, method, or article of manufacture. One or more features of an implementation can be combined with the base implementation. Implementations that are not mutually exclusive are taught to be combinable.

One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computer-implemented method comprising:
detecting occurrence of an event in a cloud environment;

obtaining an indication of an identity associated with the event;

obtaining an indication of a usage time stamp representing usage time of a privilege in association with the identity for the event in the cloud environment;

classifying the privilege into a classification group selected from a plurality of predefined classification groups, each respective classification group, of the plurality of predefined classification groups, grouping a respective set of privileges defined in the cloud environment;

obtaining a grant time stamp representing a grant time of at least one privilege, in the respective set of privileges in the classification group, to the identity;

based on the usage time stamp and the grant time stamp, generating an excessive privilege determination that indicates the classification group includes at least one excessive privilege; and performing a computing action based on the excessive privilege determination.

2. The computer-implemented method of claim 1, wherein detecting the occurrence of the event comprises accessing an event record.

3. The computer-implemented method of claim 2, wherein accessing the event record comprises deploying an event log scanner that scans an event log and returns event metadata representing the event, the event metadata including privilege metadata that identifies the privilege, identity metadata that identifies the identity that utilized the privilege, resource metadata that identifies a resource accessed using the privilege, and timestamp metadata representing the usage time stamp.

4. The computer-implemented method of claim 1, wherein the identity comprises at least one of a user or a role, and the event comprises a resource access event of the at least one of a user or a role to a resource.

5. The computer-implemented method of claim 1, wherein performing the computing action comprises:

generating a user interface display that renders a representation of the excessive privilege determination, or performing a privilege revocation that revokes the respective set of privileges in classification group.

6. The computer-implemented method of claim 1, wherein each respective classification group, of the plurality of predefined classification groups, is represented by a target computing action in the cloud environment.

7. The computer-implemented method of claim 6, wherein the respective set of privileges, in each respective classification group, is grouped based on a threshold similarity to the target computing action.

8. The computer-implemented method of claim 1, and further comprising:

parsing a collection of granular privileges that represents semantic similarities between privileges in the collection of granular privileges; and building a mapping file that maps, for each respective classification group of the plurality of predefined classification groups, two or more granular privileges from the collection of granular privileges into the respective classification group.

9. The computer-implemented method of claim 8, and further comprising:

accessing policy data and identifying, based on the policy data, a set of grant times, wherein each respective grant time, in the set of grant times, represents a time at which a corresponding granular privilege, in the collection of granular privileges, was granted to a subject identity, the corresponding granular privilege defining access permissions for the subject identity to a subject resource.

10. The computer-implemented method of claim 9, and further comprising:

mapping the set of grant times to the plurality of predefined classification groups and generating an infrastructure graph to include
nodes that represent the subject identities,
nodes that represent the subject resources, and
edges that represent the set of grant times.

11. The computer-implemented method of claim 10, and further comprising:

updating the infrastructure graph to include an indication of the usage time stamp; and generating the excessive privilege determination based on a comparison of the grant time stamp to the usage time stamp in the updated infrastructure graph.

12. A computing system comprising:

at least one processor; and memory storing instructions executable by the at least one processor, wherein the instructions, when executed, cause the computing system to:

detect occurrence of an event in a cloud environment;

obtain an indication of an identity associated with the event;

obtain an indication of a usage time stamp representing usage time of a privilege in association with the identity for the event in the cloud environment;

classify the privilege into a classification group selected from a plurality of predefined classification groups, each respective classification group, of the plurality of predefined classification groups, grouping a respective set of privileges defined in the cloud environment;

based on a comparison of the usage time stamp to a threshold, generate an excessive privilege determination that indicates the classification group includes at least one excessive privilege; and perform a computing action based on the excessive privilege determination.

13. The computing system of claim 12, wherein the instructions, when executed, cause the computing system to:

deploy an event log scanner that scans an event log including an event record representing the event; and return event metadata representing the event, the event metadata including privilege metadata that identifies the privilege, identity metadata that identifies the identity that utilized the privilege, resource metadata that identifies a resource accessed using the privilege, and timestamp metadata representing the usage time stamp.

14. The computing system of claim 12, wherein the identity comprises at least one of a user or a role, and the event comprises a resource access event of the at least one of a user or a role to a resource, and wherein the instructions, when executed, cause the computing system to:

obtain a grant time stamp representing a grant time of at least one privilege, in the respective set of privileges in the classification group, to the identity;

generate the excessive privilege determination based on a comparison of the usage time stamp to the grant time stamp.

15. The computing system of claim 12, wherein each respective classification group, of the plurality of predefined classification groups, is represented by a target computing action in the cloud environment.

16. The computing system of claim 12, wherein the instructions, when executed, cause the computing system to:
- parse a collection of granular privileges that represents semantic similarities between privileges in the collection of granular privileges; and
- build a mapping file that maps, for each respective classification group of the plurality of predefined classification groups, two or more granular privileges from the collection of granular privileges into the respective classification group.

17. The computing system of claim 16, wherein the instructions, when executed, cause the computing system to:
- identify, based on policy data, a set of grant times,
  - wherein each respective grant time, in the set of grant times, represents a time at which a corresponding granular privilege, in the collection of granular privileges, was granted to a subject identity, and
  - the corresponding granular privilege defines access permissions for the subject identity to a subject resource.

18. The computing system of claim 17, wherein the instructions, when executed, cause the computing system to:
- map the set of grant times to the plurality of predefined classification groups and generating an infrastructure graph to include
  - nodes that represent the subject identities,
  - nodes that represent the subject resources, and
  - edges that represent the set of grant times.

\* \* \* \* \*